United States Patent
Van der Merwe et al.

(10) Patent No.: US 10,044,678 B2
(45) Date of Patent: Aug. 7, 2018

(54) METHODS AND APPARATUS TO CONFIGURE VIRTUAL PRIVATE MOBILE NETWORKS WITH VIRTUAL PRIVATE NETWORKS

(75) Inventors: Jacobus Van der Merwe, New Providence, NJ (US); Arati Baliga, Edison, NJ (US); Xu Chen, Ann Arbor, MI (US); Baris Coskun, Brooklyn, NY (US); Gustavo de los Reyes, Fair Haven, NJ (US); Seungjoon Lee, Basking Ridge, NJ (US); Suhas Mathur, Edison, NJ (US); Gang Xu, Piscataway, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1057 days.

(21) Appl. No.: 13/222,876

(22) Filed: Aug. 31, 2011

(65) Prior Publication Data

US 2013/0054763 A1    Feb. 28, 2013

(51) Int. Cl.
| | |
|---|---|
| G06F 15/16 | (2006.01) |
| G06F 15/173 | (2006.01) |
| H04L 29/06 | (2006.01) |
| H04W 8/12 | (2009.01) |
| H04W 12/00 | (2009.01) |
| H04L 29/12 | (2006.01) |

(52) U.S. Cl.
CPC .......... *H04L 63/0272* (2013.01); *H04W 8/12* (2013.01); *H04W 12/00* (2013.01); *H04L 61/2007* (2013.01); *H04L 61/2038* (2013.01); *H04L 61/6022* (2013.01)

(58) Field of Classification Search
CPC .................................. G06F 15/177; G06F 9/00
USPC ........................................ 709/220, 217, 224
See application file for complete search history.

(56) References Cited

U.S. PATENT DOCUMENTS

| | | | |
|---|---|---|---|
| 5,345,502 A | 9/1994 | Rothenhofer | |
| 5,475,819 A | 12/1995 | Miller et al. | |
| 5,623,601 A | 4/1997 | Vu | |
| 6,016,318 A | 1/2000 | Tomoike | |
| 6,029,067 A | 2/2000 | Pfundstein | |
| (Continued) | | | |

OTHER PUBLICATIONS

Van Der Merwe et al., "Dynamic Connectivity Management with an Intelligent Route Service Control Point," AT&T Labs, Proceedings of the 2006 SIGCOMM Workshop on Internet Network Management, held on Sep. 11-16, 2006, 6 pages.

(Continued)

*Primary Examiner* — Karen Tang
(74) *Attorney, Agent, or Firm* — Hanley, Flight and Zimmerman, LLC

(57) ABSTRACT

Methods and apparatus to configure virtual private mobile networks with virtual private networks are disclosed. A disclosed example method includes logically provisioning, for a client, the virtual private mobile network to process wireless network communications associated with the client that correspond to a specified address space of the client, provisioning at least a portion of a server within a cloud computing data center to host resources for the client, and configuring at least a portion of an edge router of the cloud computing data center to transmit the wireless network communications between the portion of the server and the virtual private mobile network.

14 Claims, 10 Drawing Sheets

(56) References Cited

U.S. PATENT DOCUMENTS

| | | | |
|---|---|---|---|
| 6,058,426 A | 5/2000 | Godwin et al. | |
| 6,079,020 A | 6/2000 | Liu | |
| 6,205,488 B1 | 3/2001 | Casey et al. | |
| 6,255,943 B1 | 7/2001 | Lewis et al. | |
| 6,781,982 B1 | 8/2004 | Borella et al. | |
| 6,880,002 B2 | 4/2005 | Hirschfeld et al. | |
| 6,885,864 B2 | 4/2005 | McKenna et al. | |
| 6,891,842 B2 | 5/2005 | Sahaya et al. | |
| 6,954,790 B2 | 10/2005 | Forslow | |
| 6,976,177 B2 | 12/2005 | Ahonen | |
| 6,990,666 B2 | 1/2006 | Hirschfeld et al. | |
| 7,072,346 B2 | 7/2006 | Hama | |
| 7,075,933 B2 | 7/2006 | Aysan | |
| 7,126,921 B2 | 10/2006 | Mark et al. | |
| 7,131,141 B1 | 10/2006 | Blewett et al. | |
| 7,185,106 B1 | 2/2007 | Moberg et al. | |
| 7,221,675 B2 | 5/2007 | Bryden et al. | |
| 7,225,270 B2 | 5/2007 | Barr et al. | |
| 7,292,575 B2 | 11/2007 | Lemieux et al. | |
| 7,340,519 B1 | 3/2008 | Golan et al. | |
| 7,366,188 B2 | 4/2008 | Kim | |
| 7,388,844 B1 | 6/2008 | Brown et al. | |
| 7,400,611 B2 | 7/2008 | Mukherjee et al. | |
| 7,415,627 B1 | 8/2008 | Radhakrishnan et al. | |
| 7,562,254 B2 | 7/2009 | Davis et al. | |
| 7,627,787 B1 | 12/2009 | Johnson et al. | |
| 7,738,891 B2 | 6/2010 | Tenhunen et al. | |
| 7,769,036 B2 | 8/2010 | Sorge et al. | |
| 7,796,039 B2 | 9/2010 | Brillhart et al. | |
| 7,971,106 B2 | 6/2011 | Lovy et al. | |
| 8,077,681 B2* | 12/2011 | Ahmavaara | H04L 12/2856 370/338 |
| 8,380,863 B2* | 2/2013 | Natarajan et al. | 709/229 |
| 8,458,787 B2* | 6/2013 | Wei et al. | 726/15 |
| 8,509,169 B2 | 8/2013 | Van Der Merwe et al. | |
| 8,566,653 B2 | 10/2013 | Merwe et al. | |
| 9,386,035 B2 | 7/2016 | Baliga et al. | |
| 9,432,258 B2 | 8/2016 | Van der Merwe et al. | |
| 2002/0181477 A1 | 12/2002 | Mo et al. | |
| 2003/0051021 A1 | 3/2003 | Hirschfeld et al. | |
| 2003/0147403 A1* | 8/2003 | Border et al. | 370/395.53 |
| 2003/0188001 A1 | 10/2003 | Eisenberg et al. | |
| 2004/0030712 A1 | 2/2004 | Sano et al. | |
| 2004/0073642 A1 | 4/2004 | Iyer | |
| 2004/0148439 A1 | 7/2004 | Harvey et al. | |
| 2005/0071508 A1* | 3/2005 | Brown et al. | 709/246 |
| 2005/0138204 A1 | 6/2005 | Iyer et al. | |
| 2005/0195780 A1* | 9/2005 | Haverinen | H04L 63/0272 370/338 |
| 2006/0025149 A1* | 2/2006 | Karaoguz | H04N 21/4126 455/452.2 |
| 2006/0068845 A1* | 3/2006 | Muller et al. | 455/558 |
| 2006/0111113 A1 | 5/2006 | Waris | |
| 2006/0168279 A1 | 7/2006 | Lee et al. | |
| 2006/0168321 A1 | 7/2006 | Eisenberg et al. | |
| 2006/0242305 A1 | 10/2006 | Alnas | |
| 2006/0251088 A1 | 11/2006 | Thubert et al. | |
| 2006/0268901 A1 | 11/2006 | Choyi et al. | |
| 2007/0039047 A1* | 2/2007 | Chen et al. | 726/22 |
| 2007/0070914 A1* | 3/2007 | Abigail | 370/252 |
| 2007/0105548 A1 | 5/2007 | Mohan et al. | |
| 2007/0140250 A1 | 6/2007 | McAllister et al. | |
| 2007/0140251 A1 | 6/2007 | Dong | |
| 2007/0195800 A1 | 8/2007 | Yang et al. | |
| 2007/0217419 A1 | 9/2007 | Vasseur | |
| 2007/0232265 A1 | 10/2007 | Park et al. | |
| 2007/0271606 A1 | 11/2007 | Amann et al. | |
| 2007/0280241 A1 | 12/2007 | Verma | |
| 2008/0002697 A1 | 1/2008 | Anantharamaiah et al. | |
| 2008/0022094 A1 | 1/2008 | Gupta et al. | |
| 2008/0034365 A1 | 2/2008 | Dahlstedt | |
| 2008/0049752 A1 | 2/2008 | Grant | |
| 2008/0080396 A1 | 4/2008 | Meijer et al. | |
| 2008/0080517 A1 | 4/2008 | Roy et al. | |
| 2008/0080552 A1 | 4/2008 | Gates et al. | |
| 2008/0082546 A1 | 4/2008 | Meijer et al. | |
| 2008/0125116 A1* | 5/2008 | Jiang | H04W 8/06 455/433 |
| 2008/0148341 A1 | 6/2008 | Ferguson et al. | |
| 2008/0201642 A1 | 8/2008 | Chong et al. | |
| 2008/0307259 A1 | 12/2008 | Vasudevan et al. | |
| 2009/0006603 A1 | 1/2009 | Duponchel et al. | |
| 2009/0006909 A1 | 1/2009 | Ladd et al. | |
| 2009/0013222 A1 | 1/2009 | Di Luoffo et al. | |
| 2009/0055693 A1 | 2/2009 | Budko et al. | |
| 2009/0113422 A1* | 4/2009 | Kani | G06F 9/5077 718/1 |
| 2010/0011298 A1 | 1/2010 | Campbell et al. | |
| 2010/0017861 A1 | 1/2010 | Krishnaswamy et al. | |
| 2010/0039978 A1 | 2/2010 | Rangan | |
| 2010/0077310 A1 | 3/2010 | Karachale et al. | |
| 2010/0111093 A1 | 5/2010 | Satterlee et al. | |
| 2010/0186024 A1 | 7/2010 | Eker et al. | |
| 2010/0284343 A1 | 11/2010 | Maxwell et al. | |
| 2011/0007690 A1 | 1/2011 | Chang et al. | |
| 2011/0026648 A1 | 2/2011 | Conrad et al. | |
| 2011/0072312 A1 | 3/2011 | Fan et al. | |
| 2011/0131499 A1 | 6/2011 | Ferris et al. | |
| 2011/0142053 A1 | 6/2011 | Van Der Merwe et al. | |
| 2011/0154101 A1 | 6/2011 | Merwe et al. | |
| 2011/0177790 A1 | 7/2011 | Monte et al. | |
| 2011/0302630 A1* | 12/2011 | Nair et al. | 726/4 |
| 2012/0106565 A1 | 5/2012 | Yousefi et al. | |
| 2012/0147824 A1* | 6/2012 | Van der Merwe | H04W 84/02 370/329 |
| 2012/0155274 A1 | 6/2012 | Wang et al. | |
| 2012/0208506 A1 | 8/2012 | Hirano et al. | |
| 2012/0282924 A1 | 11/2012 | Tagg et al. | |
| 2012/0303835 A1* | 11/2012 | Kempf et al. | 709/235 |
| 2012/0311107 A1* | 12/2012 | Van der Merwe | H04L 41/083 709/220 |
| 2012/0331545 A1* | 12/2012 | Baliga | H04L 63/145 726/15 |
| 2013/0007232 A1* | 1/2013 | Wang et al. | 709/222 |
| 2013/0031271 A1* | 1/2013 | Bosch et al. | 709/245 |
| 2013/0089026 A1* | 4/2013 | Piper | H04R 5/04 370/328 |
| 2015/0237543 A1* | 8/2015 | Montemurro | H04W 36/0061 455/436 |

OTHER PUBLICATIONS

Van Der Merwe et al., PowerPoint presentation of "Dynamic Connectivity Management with an Intelligent Route Service Control Point," AT&T Labs, Proceedings of the 2006 SIGCOMM Workshop on Internet Network Management, held on Sep. 11-16, 2006, 14 pages.

Brady, Kevin F., "Cloud Computing—Is It Safe for IP?" Portfolio Media, Inc., http://www.law360.com/print_article/113709 on Aug. 27, 2009. Retrieved from the Internet on Sep. 3, 2009, 8 pages.

"Amazon Elastic Computing Cloud," http://aws.amazon.com/ec2. Retrieved from the Internet on Dec. 23, 2009, 8 pages.

Armbrust et al., "Above the Clouds: A Berkeley View of Cloud Computing," Technical Report UCB/EECS-2009-28, EECS Department, University of California, Berkeley, February Technical Report No. UCB/EECS-2009-28, http://www.eecs.berkeley.edu/Pubs/TechRpts/2009/EECS-2009-28.html, Feb. 10, 2009, 25 pages.

Sundararaj et al., "Towards Virtual Networks for Virtual Machine Grid Computing," in VM '04: Proceedings of the 3rd conference on Virtual Machine Research and Technology Symposium, 2004, 14 pages.

Clark et al., "Live Migration of Virtual Machines," in Proceedings of NSDA, http://www.cl.cam.ac.uk/research/srg/netos/papers/2005-migration-nsdi-pre.pdf, May 2005, 14 pages.

Duffield et al., "Resource management with hoses: point-to-cloud services for virtual private networks," IEEE ACM Transactions on Networking, 2002, 16 pages.

Cohen, Reuven, "Elasticvapor Blog: Virtual Private Cloud," www.elasticvapor.com/2008/05/virtual-private-cloud-vpc.htm, May 8, 2008, 2 pages.

(56) References Cited

OTHER PUBLICATIONS

"Goggle App Engine" hthttp://code.google.com/appengine/. Retrieevd from the Internet on Dec. 23, 2009, 4 pages.

Nelson et al., "Fast Transparent Migration for Virtual Machines," In ATEC '05 Proceedings of the annual conference on USENIX Annual Technical Conference, 2005, 4 pages.

Ramakrishnan et al., "Live Data Center Migration Across WANs: A Robust Cooperative Context Aware Approach," in INM '07: Proceedings of the SIGCOMM workshop on Internet network management, Aug. 27-31, 2007, 6 pages.

Ruth et al., "Autonomic Live Adaptation of Virtual Computational Environments in a Multi-Domain Infrastructure," in ICAC '06: Proceedings of the 2006 IEEE International Conference of Autonomic Computing, 2006, 10 pages.

Hoffman et al., "Network Virtualization for Future Mobile Networks" Jun. 5-9 2011, 2011 IEEE International Conference (5 pages).

United States Patent and Trademark Office, "Final Office Action", issued in connection with corresponding U.S. Appl. No. 13/154,121 dated Feb. 4, 2014 (22 pages).

United States Patent and Trademark Office, "Non-Final Office Action", issued in connection with corresponding U.S. Appl. No. 13/165,250 dated Jan. 15, 2013 (14 pages).

United States Patent and Trademark Office, "Non-Final Office Action", issued in connection with corresponding U.S. Appl. No. 13/154,121 dated Jul. 17, 2013 (23 pages).

United States Patent and Trademark Office, "Final Office Action", issued in connection with corresponding U.S. Appl. No. 13/165,520 dated Jul. 30, 2013 (16 pages).

"Response to Office Action dated Jul. 17, 2013" filed on Nov. 18, 2013 in connection with corresponding U.S. Appl. No. 13/154,121 (11 pages).

"Response to Office Action dated Jan. 15, 2013" filed on Apr. 15, 2013 in connection with corresponding U.S. Appl. No. 13/165,520 (11 pages).

"Response to Office Action dated Jul. 30, 2013" filed on Oct. 30, 2013 in connection with corresponding U.S. Appl. No. 13/165,50 (10 pages).

United States Patent and Trademark Office, "Non-Final Office Action", issued in connection with corresponding U.S. Appl. No. 12/966,681 dated Dec. 20, 2012 (29 pages).

"Response to Office Action dated Dec. 20, 2012" filed on Mar. 20, 2013 in connection with corresponding U.S. Appl. No. 12/966,681 (11 pages).

United States Patent and Trademark Office, "Final Office Action," issued in connection with U.S. Appl. No. 13/154,121 dated Sep. 19, 2014 (25 pages).

United States Patent and Trademark Office, "Non-Final Office Action," issued in connection with U.S. Appl. No. 13/165,520 dated Aug. 12, 2015 (5 pages).

United States Patent and Trademark Office, "Non-Final Office Action", issued in connection with U.S. Appl. No. 12/644,879, dated Nov. 30, 2012 (14 pages).

United States Patent and Trademark Office, "Final Office Action", issued in connection with U.S. Appl. No. 12/644,879, dated Mar. 12, 2013 (13 pages).

United States Patent and Trademark Office, "Notice of Allowance", issued in connection with U.S. Appl. No. 12/644,879, dated Jun. 25, 2013 (6 pages).

United States Patent and Trademark Office, "Notice of Allowance", issued in connection with U.S. Appl. No. 13/154,121, dated Apr. 25, 2016 (15 pages).

United States Patent and Trademark Office, "Notice of Allowance", issued in connection with U.S. Appl. No. 13/165,520 dated Feb. 11, 2016 (7 pages).

Qian et al., "Balancing Request Denial Probability and Latency in an Agent-Based VPN Architecture", IEEE Transactions on Network and Service Management, vol. 7, No. 4, Dec. 2010 (14 pages).

Khanna et al., "Automated Rule-Based Diagnosis though a Distributed Monitor System", IEEE Transactions on Dependable and Secure Computing, vol. 4, No. 4, Oct.-Dec. 2007 (14 pages).

Liu et al., "Privacy Preserving Collaborative Enforcement of Firewall Policies in Virtual Private Networks", IEEE Transactions on Parallel and Distributed Systems, vol. 22, No. 5, May 2011 ( pages).

United States Patent and Trademark Office, "Non-Final Office Action", issued in connection with U.S. Appl. No. 15/194,037, dated Aug. 31, 2017 (16 pages).

United States Patent and Trademark Office, "Notice of Allowance," issued in connection with U.S. Appl. No. 15/194,037, dated Mar. 13, 2018, 22 pages.

United States Patent and Trademark Office, "Non-Final Office Action," issued in connection with U.S. Appl. No. 15/231,406, dated Feb. 22, 2018, 28 pages.

\* cited by examiner

METHODS AND APPARATUS TO CONFIGURE VIRTUAL PRIVATE MOBILE NETWORKS WITH VIRTUAL PRIVATE NETWORKS

FIELD OF THE DISCLOSURE

This disclosure relates generally to networks and, more particularly, to methods and apparatus to configure virtual private mobile networks with virtual private networks.

BACKGROUND

Virtualization of computing and networking platforms is becoming popular with clients and customers by providing flexible, customizable, on demand resources at a relatively low cost. A virtualized computing network, also known as a cloud computing network, enables clients to manage web-based applications and/or data resources by dynamically leasing computational resources and associated network resources from one or more service providers. These web-based applications, data resources, and/or routing resources may be used by customers of the clients, individuals associated with the clients, and/or by the clients. This dynamic leasing of computational and network resources creates an appearance and function of a distributed network and, thus, is referred to as virtualization of a network. Virtualized platforms utilize partitioning and allocation of network and/or computing resources. Accordingly, new resources provisioned for a client may be quickly added as needed within short periods of time by a network provider allocating an additional portion of shared resources to the client. Additionally, virtualization in a network enables network providers to dynamically multiplex resources among multiple clients without dedicating individual physical resources to each client.

DETAILED DESCRIPTION

Figure 1:
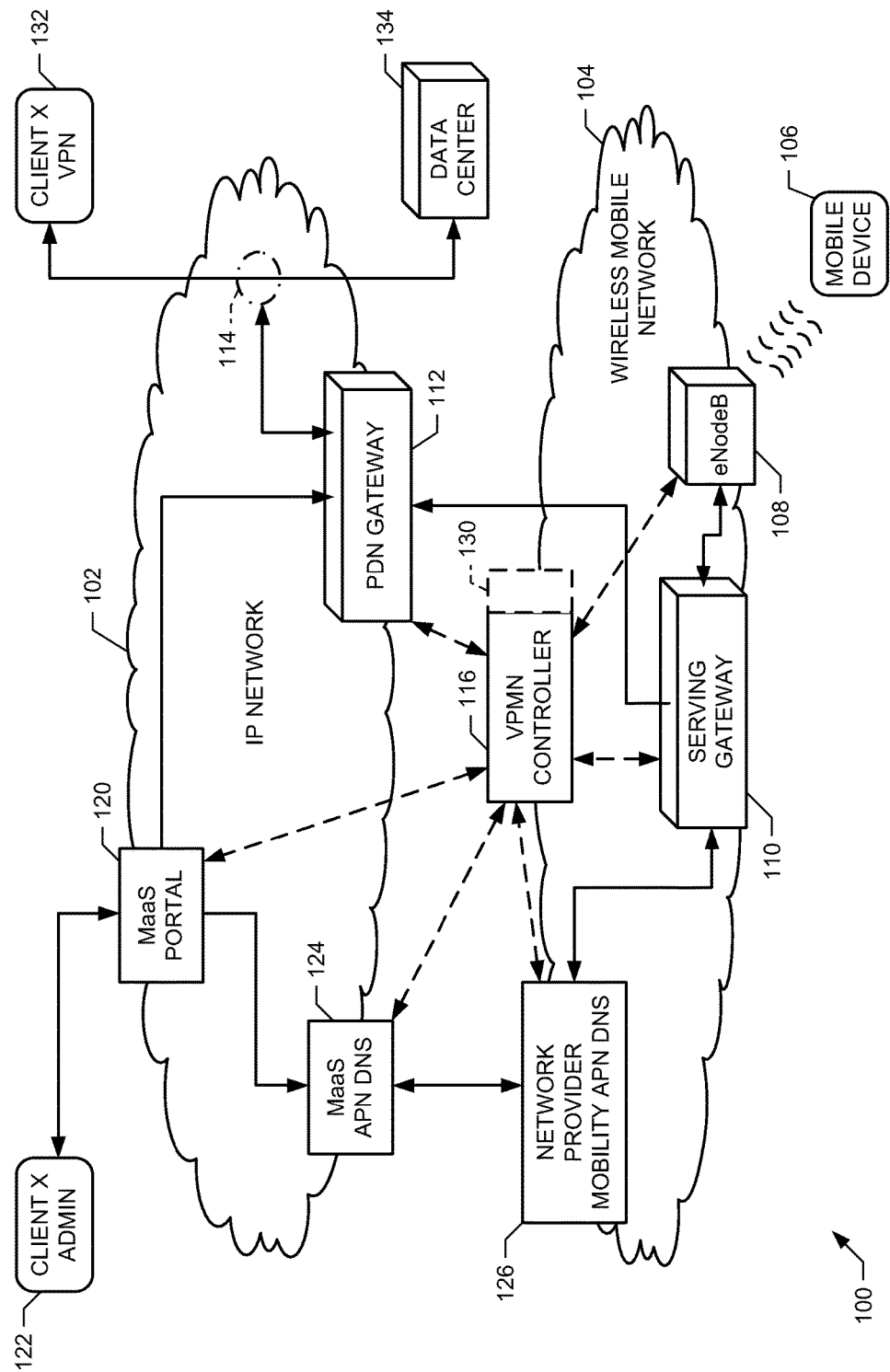
FIG. 1 is a schematic illustration of an example communication system including a wireless mobile network and a virtual private mobile network controller constructed in accordance with the teachings of this disclosure.

Example methods, articles of manufacture, and apparatus to configure virtual private mobile networks with virtual private networks are disclosed. A disclosed example method includes logically provisioning, for a client, the virtual private mobile network to process wireless network communications associated with the client that correspond to a specified address space of the client. The example method also includes provisioning at least a portion of a server within a cloud computing data center to host resources for the client. The example method further includes configuring at least a portion of an edge router of the cloud computing data center to transmit the wireless network communications between the portion of the server and the virtual private mobile network. As used herein, the term "logically provisioning" refers to the establishment of network services by changing software controls, rather than by physically installing or rearranging hardware.

A disclosed example apparatus includes an interface to receive an instruction from a client to couple a first address space associated with the virtual private network of the client to a second address space associated with a virtual private mobile network provisioned within a wireless mobile network. The example apparatus further includes a client coupler to communicatively couple the virtual private mobile network to the virtual private network by transmitting a first message to routers within an Internet Protocol network to update routing and forwarding tables to associate the first address space with the second address space.

Currently, known wireless mobile networks enable subscribing customers to connect to an external packet switched network (e.g., the Internet) via one or more mobile devices. These known wireless mobile networks provide wireless network service via dedicated hardware (e.g., network elements known as mobility network elements). In many instances, network elements are configured for a corresponding wireless communication protocol. Throughout the following disclosure, reference is made to network elements associated with the 3$^{rd}$ Generation Partnership Project (3GPP) Long Term Evolution (LTE) wireless communication standard. However, the teachings of the disclosure are applicable to network elements associated with any past, present, and/or future wireless protocol(s) and/or standard(s) such as, for example, the General Packet Radio Service (GPRS) for second generation (2G) and Wideband-Code Division Multiple Access (W-CDMA) based third generation (3G) wireless networks.

In a typical known wireless mobile network, a base transceiver station (BTS) (e.g., an LTE eNodeB) provides wireless communication service for mobile devices in a cell (e.g., a geographic area). The BTS enables one or more wireless devices to connect to an external packet switched network through the wireless mobile network. In these known wireless mobile networks, a BTS is communicatively coupled to a serving gateway (e.g., a wireless network interface, router, and/or server), which routes communications between multiple BTSs and a packet data network (PDN) gateway. The PDN gateway is an interface between the wireless mobile network and one or more external packet switched networks. In other GPRS-based wireless mobile networks, the serving gateway provides similar functionality to a Serving GPRS Support Node (SGSN) and the PDN gateway provides similar functionality to a Gateway GPRS Support Node (GGSN).

Additionally, known wireless mobile networks include a mobility management entity (MME) that monitors mobile devices on a wireless mobile network and coordinates wireless handoffs between BTSs for the mobile devices. Wireless mobile networks also include home subscriber servers (HSS) (e.g., a home location register (HLR)) that manage wireless device profiles and/or authentication information. BTSs, HSSs, HLRs, PDN gateways, and/or serving gateways are generally referred to herein as network elements.

To implement a known wireless mobile network, a wireless mobile network provider manages and/or configures network elements. The wireless mobile network enables customers of a wireless mobile network provider to subscribe to the wireless mobile network to receive and/or transmit voice and/or data communications. Many network providers configure network elements to provide wireless service to any subscribing customer of the network provider. In other words, any subscribing customers of a network provider may access a wireless mobile network managed by the network provider.

Additionally, many network providers lease portions of their wireless mobile network to mobile virtual network operators (MVNOs). An MVNO (e.g., Virgin Mobile) is a company that provides mobile device services but does not own, control, and/or manage its own licensed frequency allocation of a wireless spectrum and/or does not own, control, and/or manage network elements needed to create a wireless mobile network. To provide mobile device services, an MVNO leases bandwidth and/or portions of a wireless spectrum from another entity (e.g., a wireless mobile network provider). In this manner, an MVNO may compete with a wireless mobile network provider for customers but use the same wireless mobile network managed by that same wireless mobile network provider and/or a different wireless mobile network provider.

In other instances, an MVNO may be a relatively large business and/or government entity that leases a portion of a wireless mobile network for private and/or proprietary use. For example, a military may lease a portion of a wireless mobile network. In these other instances, users associated with the MVNO (e.g., employees, agents, and/or contractors of the MVNO) use the leased portion of the wireless mobile network to communicatively couple to data centers and/or computing elements managed by the MVNO.

Currently, some enterprise MVNOs (e.g., large corporations) utilize business applications that are configured for mobile devices to enable employees, agents, and/or contractors to access data and/or functions associated with the enterprise. These enterprise MVNOs also subscribe, lease, and/or own cloud computing data centers that host virtualized resources to operate applications and/or store data associated with the enterprise. In this manner, employees of the enterprise MVNO can access enterprise business applications and/or data from within a virtual private network (VPN) of the enterprise and/or via mobile devices through a public wireless network or a private mobile network.

Making business applications and/or data hosted by a cloud computing data center accessible to business logic resident on servers within the enterprise currently involves implementing overlay virtual networks to provide secure connection(s). These overlay virtual networks generally only provide single entry points to the enterprise through a designed VPN gateway. Such a single entry point is oftentimes bandwidth limited and results in traffic restrictions and/or sub-optimal performance.

Example methods, apparatus, and articles of manufacture disclosed herein dynamically and/or logically configure a wireless mobile network by partitioning network elements to create a virtual private mobile network (VPMN). Example methods, apparatus, and articles of manufacture disclosed herein communicatively couple a VPMN to a VPN of a client and/or to a cloud computing data center hosting virtualized resources to create a bundled service across mobility, cloud, and/or enterprise platforms. Such example methods, apparatus, and articles of manufacture enable an enterprise to create a mobile-platform-as-a-service (MPaaS) hosted by virtual machine(s) that are securely accessible by any user (e.g., employee) within an enterprise VPN and/or by any user with a mobile device that is approved by the enterprise.

In some disclosed examples, in addition to MPaaS, the example virtual machines may host software-as-a-service (SaaS) web-based front-end applications (e.g., online retail businesses), infrastructure-as-a-service (IaaS) data processing applications, mobile IaaS (MIaas), computing-as-a service (CaaS) applications, and/or storage-as-a-service database management applications. Some such example methods, apparatus, and articles of manufacture provide application programming interfaces (APIs) that clients (e.g., enterprises) use to create, modify, specify, etc. data and/or control information used to configure enterprise applications. In this manner, an application service development platform is provided for enterprises in mobility and/or cloud environments.

A VPMN enables wireless network providers to partition and/or configure a portion of network elements with routing and/or forwarding protocols to reduce propagation times during data transfers in a wireless network. A VPMN may also enable wireless network providers to implement latency reducing protocols logically separate from routing and/or forwarding protocols for low volume data and/or communications. Example VPMNs are coupled to enterprise VPNs of enterprise clients and to cloud computing data centers so that mobile devices associated with the enterprise can securely access applications and/or data hosted by a virtual machine.

A VPMN provides private network communications on shared network elements. In some examples, a VPMN extends end-to-end on a wireless mobile network. In other examples, a VPMN only includes some network elements and/or some types of network elements. To partition (e.g., virtualize) network elements, portions of a control plane and/or a data plane of the network elements are partitioned for a particular VPMN. Partitioning network elements may also include partitioning processing power and/or bandwidth of the network elements for a particular VPMN to separate the VPMN from other portions of a wireless mobile network. Virtualizing VPMNs in a wireless mobile network enables the VPMNs to provide a private secure virtual circuit (and/or a private path using similar technology such as, for example, a Multiprotocol Label Switching (MPLS) path) extending from mobile devices to an external packet switched network, other mobile devices, and/or data centers of an MVNO.

As used herein, the term "provisioning" generally refers to reserving, providing, equipping, and/or initiating one or more resources (e.g., computing resource(s), communications resource(s), etc.) for one or more purposes. To provision a VPMN, example methods, apparatus, and articles of manufacture disclosed herein determine which network elements within a wireless mobile network have available capacity and/or bandwidth to host a VPMN. Example methods, apparatus, and articles of manufacture disclosed herein then configure data and/or control planes of the determined network elements to host the VPMN. The control planes may create wireless mobile network virtual circuits and/or paths between the network elements to isolate communications within a VPMN from communications external to the VPMN.

Example methods, apparatus, and articles of manufacture disclosed herein configure cloud computing data centers to couple securely to a VPMN and a VPN of a client via a managed Internet Protocol (IP) address space associated with an enterprise. In some such examples, virtual machines assigned to a client enterprise are coupled through a cloud computing data center via virtual local area networks (VLANs) based on the IP address space. The VLANs of these examples provide a secure virtual route through the data center that isolates communications associated with the enterprise from other clients. The example VLANs of such examples are extended to routers within IP networks by updating routing and forwarding tables within network routers with routing information based on the IP address space of a VPN of an enterprise client and the destination virtual machines. Thus, a VLAN within a cloud computing data center can be extended through a public IP network to securely couple to a VPN of a client so that only network traffic from within a VPN associated with a client may access a corresponding virtual machine.

Example methods, apparatus, and articles of manufacture disclosed herein couple a VPMN of a client to the VPN and VLAN of the cloud computing data center by storing access point names (APNs) and/or an IP address space of the VPMN to the routing and forwarding tables of the network routers. For example, a PDN gateway may be instructed to transmit communications associated with a client from a VPMN associated with the client to specific interfaces of network routers to reach a VPN of the client and/or resources hosted by a virtual machine provisioned for the client. Thus, communications from mobile devices that are routed through a VPMN to an IP network are then routed through the virtualized tunnel specified by the routing and forwarding tables. This enables mobile devices associated with a client to access applications and/or data located within an enterprise VPN of the client or applications and/or data hosted by a virtual machine in a cloud computing data center.

In some disclosed examples, local PDN gateways communicatively coupled to mobile data centers are configured to host enterprise applications and/or data that are physically close to mobile devices. In some such examples, the mobile data centers are virtualized and coupled to an external network via a WLAN so that mobile devices can access enterprise applications and/or data securely through the VPMN. In some examples, these mobile data centers are utilized for latency sensitive enterprise applications. By utilizing physically close mobile data centers, the example methods, apparatus, and articles of manufacture disclosed herein can reduce communication propagation times, thereby improving latency.

Latency sensitive applications may be programs, algorithms, functions, and/or routines operating on mobile devices that process, download, and/or upload relatively large volumes of time-sensitive data. For example, streaming media applications require a relatively quick and consistent download speed for a high volume of data to play movies, videos, music, website content, and/or any other media type. In another example, a latency sensitive application includes computational applications (e.g., video editing applications, cloud computing applications, etc.) that offload processing capabilities from a mobile device to a data center, remote server, and/or network elements. In such contexts, a delay in data transfer may result in longer processing times.

In the interest of brevity and clarity, throughout the following disclosure, reference will be made to an example communication system 100 shown in FIG. 1, which is associated with the Long Term Evolution (LTE) standard. However, methods, articles of manufacture, and apparatus disclosed herein to configure virtual private mobile networks to reduce latency are applicable to other type(s) of networks constructed using other past, present, and/or future network technologies, topologies and/or protocols.

FIG. 1 illustrates an example communication system 100 that includes an IP network 102 (e.g., an external packet switched network, the Internet, X.25, a WiMax network, etc.) and a wireless mobile network 104. The example IP network 102 of FIG. 1 includes any number and/or types of routers, switches, servers, etc. to enable communications (e.g., packet-based data). The example IP network 102 of FIG. 1 utilizes and/or conforms to past, present, and/or future routing and/or communication protocols. The example wireless mobile network 104 (e.g., wireless network) of FIG. 1 may be implemented by any network for routing and/or managing communications between the IP network 102 and mobile devices (e.g., mobile device 106).

In the illustrated example, the wireless mobile network 104 includes and/or is associated with network elements 108-112. The example network elements 108-112 illustrate an example manner of communicatively coupling a mobile device 106 to the IP network 102. In other examples, the wireless mobile network 104 includes additional network elements and/or different types of network elements including, for example, an MME, an HSS, and/or a policy charging and rules function (PCRF) server. Further, although the example network elements 108-112 of FIG. 1 correspond to the LTE standard, in other examples, the network elements 108-112 may be associated with any other past, present, and/or future wireless communication protocol and/or standard including, for example, Universal Mobile Telecommunication System (UMTS) and/or GPRS.

The example mobile device 106 (e.g., user equipment (UE)) of the illustrated example includes any device capable of wirelessly communicatively coupling to the wireless mobile network 104. For example, the mobile device 106 may be implemented by one or more of a laptop, a smartphone, a computing pad (e.g., iPad), a personal digital assistant, a tablet computer, a personal communicator, etc. Additionally, while FIG. 1 illustrates one mobile device 106, the example communication system 100 may include any number of mobile devices.

To wirelessly connect to the wireless mobile network 104, the example wireless mobile network 104 of FIG. 1 includes the eNodeB 108. The example eNodeB 108 of FIG. 1 is implemented by a BTS (e.g., an access point) and includes one or more controllers, transmitters, receivers, and/or signal generators to provide a wireless spectrum to facilitate wireless communication with, for example, the mobile device 106. The example eNodeB 108 of FIG. 1 transforms communications received from the serving gateway 110 into a wireless signal transmitted to the mobile device 106. Similarly, the example eNodeB 108 of FIG. 1 transforms wireless communications received from the mobile device 106 into a wired communication that may be routed to the IP network 102.

To route communications to and/or from the eNodeB 108, the example wireless mobile network 104 of FIG. 1 includes a serving gateway 110. The example serving gateway 110 of FIG. 1 routes and/or forwards communications (e.g., data packets) between a PDN gateway 112 and one or more mobile devices (e.g., device 106) that are within a geographical area assigned to the serving gateway 110. Location registers within the example serving gateway 110 store location information including, for example, a geographic location of the eNodeB 108, visitor location register (VLR) information, and/or user profile information of the mobile device 106. The example serving gateway 110 of FIG. 1 may also provide authentication and/or charging functions to enable the mobile device 106 to access the wireless mobile network 104.

The example serving gateway 110 also functions as a mobility anchor for a user plane during inter-eNodeB handovers of the mobile device 106. In other words, the serving gateway 110 ensures the mobile device 106 is connected to an eNodeB when the mobile device 106 moves to a different physical location. The example serving gateway 110 further manages and stores contexts (e.g. parameters of the IP wireless mobile network, latency routing information, latency sensitive applications, and/or network internal routing information) associated with the mobile device 106. While the wireless mobile network 104 of FIG. 1 shows a single serving gateway 110, the wireless mobile network 104 may include any number of serving gateways.

To interface with the IP network 102 of the illustrated example, the example wireless mobile network 104 is associated with the PDN gateway 112. In this example, the PDN gateway 112 is communicatively coupled to the IP network 102 via an interface 114. The example PDN gateway 112 functions as a router by routing communications from the wireless mobile network 104 to an appropriate edge and/or network router within the IP network 102. Also, the PDN gateway 112 routes communications directed to the mobile device 106 from the IP network 102 to an appropriate serving gateway (e.g., the gateway 110). In some examples, the PDN gateway 112 may determine if the mobile device 106 is active (e.g., available to receive the communications) by sending a query to the serving gateway 110. If the serving gateway 110 indicates the mobile device 106 is active, the serving gateway 110 sends a response to the PDN gateway 112 causing the PDN gateway 112 to forward communications from the mobile device 106 to the serving gateway 110. If the mobile device 106 is inactive and/or unavailable, the PDN gateway 112 may discard the communications and/or query other serving gateways in the wireless mobile network 104.

In some examples, the PDN gateway 112 transforms and/or converts communications originating from the mobile device 106 received via the serving gateway 110 into an appropriate packet data protocol (PDP) format (e.g., IP, X.25, etc.) for propagation through the IP network 102. Additionally, for communications received from the IP network 102, the PDN gateway 112 converts the communications into a wireless protocol (e.g., 3GPP LTE, Global System for Mobile Communications (GSM), etc.). The example PDN gateway 112 then readdresses the communications to the corresponding serving gateway 110.

To configure VPMNs on the network elements 108-112, the wireless mobile network 104 includes a VPMN controller 116. The example VPMN controller 116 receives requests from the network elements 108-112 to create a VPMN for communications associated with latency sensitive applications originating from, for example, the mobile device 106. The example VPMN controller 116 may also receive requests from clients (e.g., enterprise MVNOs) for VPMNs. To create a VPMN, the example VPMN controller 116 identifies available portions of the network elements 108-112 for the requested VPMNs, and partitions control and/or data plane space on the network elements 108-112 to configure the VPMNs. In some examples, the VPMN controller 116 may also configure the mobile device 106 to access a VPMN.

To receive requests to create a VPMN, the example communication system 100 of FIG. 1 includes a Mobility-as-a-Service (Maas) portal 120. The MaaS portal 120 enables clients to specify requirements (e.g., latency protocols) for a VPMN. In some examples, the MaaS portal 120 is an interface (e.g., an API) of the VPMN controller 116 that a client accesses via the IP network 102. In other examples, the client may directly access the VPMN controller 116.

In the illustrated example, a client administrator 122 (e.g., an information technology agent of the Client X) accesses the MaaS portal 120 to request a VPMN. The request for a VPMN may include a list of mobile devices that are to be authorized to access the VPMN, an estimated maximum and/or average amount of bandwidth to be utilized, a geographic location for the VPMN (including a geographic location of the eNodeB 108 and/or the serving gateway 110), administrative information, billing information, security information, latency routing information, client VPN information including IP address space, IP addresses of virtual machines, and/or any other information that may be useful to provision and/or couple a VPMN.

In response to the client administrator 122 requesting a VPMN, the MaaS portal 120, via the VPMN controller 116, establishes a VPMN through the network elements 108-112. Examples of VPMNs are described below in conjunction with FIGS. 3-6. To enable mobile devices associated with the client administrator 122 to access the newly created VPMN, the VPMN controller 116 assigns the VPMN an Access Point Name (APN). The APN enables communications from identified mobile devices to be routed through the wireless mobile network 104 via a VPMN.

More specifically, an APN identifies a PDN that a mobile device is to communicatively couple. The APN may also define a type of service, server, and/or multimedia message service that is provided by a PDN. In the illustrated example, the APN includes a network identifier and an operator identifier. The network identifier defines an external network to which the PDN gateway 112 is connected (e.g., the IP network 102). The operator identifier specifies which network (e.g., VPMN) is associated with the PDN gateway 112. In the example of FIG. 1, the VPMN controller 116 uses operator identifiers of APNs to identify the VPMN to which communications from a mobile device are to be routed.

The example VPMN controller 116 of FIG. 1 transmits an assigned APN to subscribing customers (e.g., employees of the Client X establishing the VPMN) who have been identified as authorized users of the VPMN. The VPMN controller 116 also registers the APN with APN domain name system (DNS) servers 124 and 126 within the respective networks 102 and 104. Registering the APN with the APN DNS servers 124 and 126 enables communications associated with a VPMN to be routed to the appropriate VPMN on the network elements 108-112 when the VPMN controller 116 is unable to extend the VPMN from end-to-end (e.g., from the eNodeB 108 to the interface 114 of the PDN gateway 112). Thus, the use of APNs enables the VPMN controller 116 to provision a VPMN over a portion of the network elements 108-112 when other network elements are not capable and/or are not configured to host the VPMN.

To communicatively couple a VPMN to a client VPN 132 and/or a cloud computing data center 134, the example VPMN controller 116 includes a client coupler 130. The example client coupler 130 uses information provided by the client administrator 122 to create a secure route and/or path through the IP network 102 to the client VPN 132 via the example interface 114. For example, the client coupler 130 uses an IP address space of the client VPN 132 to update routing and forwarding tables of network routers within the IP network 102. These network routers then route communications with a destination address of the client VPN 132 from the client VPMN through the IP network 102 to the client VPN 132.

The example client VPN 132 includes any number of routers, switches, firewalls, servers, processors, and/or computers. The client VPN 132 may extend among multiple physical locations and be managed by, for example, the client administrator 122. The client VPN 132 has an IP address space that includes IP addresses assigned to computing resources within and/or communicatively coupled to the client VPN 132.

The example client coupler 130 of FIG. 1 also couples VPMNs to virtual machines located at, for example, the cloud computing data center 134. To couple a VPMN to the cloud computing data center 134, the example client coupler 130 updates routers within the IP network 102 and/or edge routers of the data center 134 with an IP address space of the destination virtual machine(s) and/or an IP address space of the VPMN. Thus, communications with a destination IP address of a virtual machine within the data center 134 are transmitted from a VPMN to the appropriate router in the IP network 102 at the interface 114. The router then transmits the communications to other router(s) along a specified virtual path until the communications are received at the cloud computing data center 134. The example client coupler 130 may also create a VLAN within the data center 134 that routes the communications securely to the appropriate virtual machine so that a virtual tunnel is created from a virtual machine through the networks 102 and 104 to the mobile device 106.

The example cloud computing data center 134 (e.g., a distributive computing network) includes any server, processor, computer, etc. that can be partitioned into virtualized portions. While the single cloud computing data center 134 is shown in FIG. 1, the data center 134 could include multiple servers located at different physical locations that are configured to share resources. Additionally, the virtual machine(s) hosted by the cloud computing data center 134 can be implemented by any operating system, hardware, and/or application.

In some instances, the example client coupler 130 can be implemented within the cloud computing data center 134 and the VPMN controller 116. For example, the client coupler 130 within the data center 134 can create a VLAN from a virtual machine to an edge router and/or couple the VLAN to the example client VPN 132. In such examples, another client coupler located within the VPMN controller 116 may communicatively couple a VPMN to the client VPN 132 and/or to the VLAN of the cloud computing data center 134. Alternatively, the example client coupler 130 may be located within the cloud computing data center 134 (e.g., when the cloud computing data center 134 is managed by a wireless network provider) and/or may be located as a separate computing entity within either of the networks 102 and 104.

Figure 2:
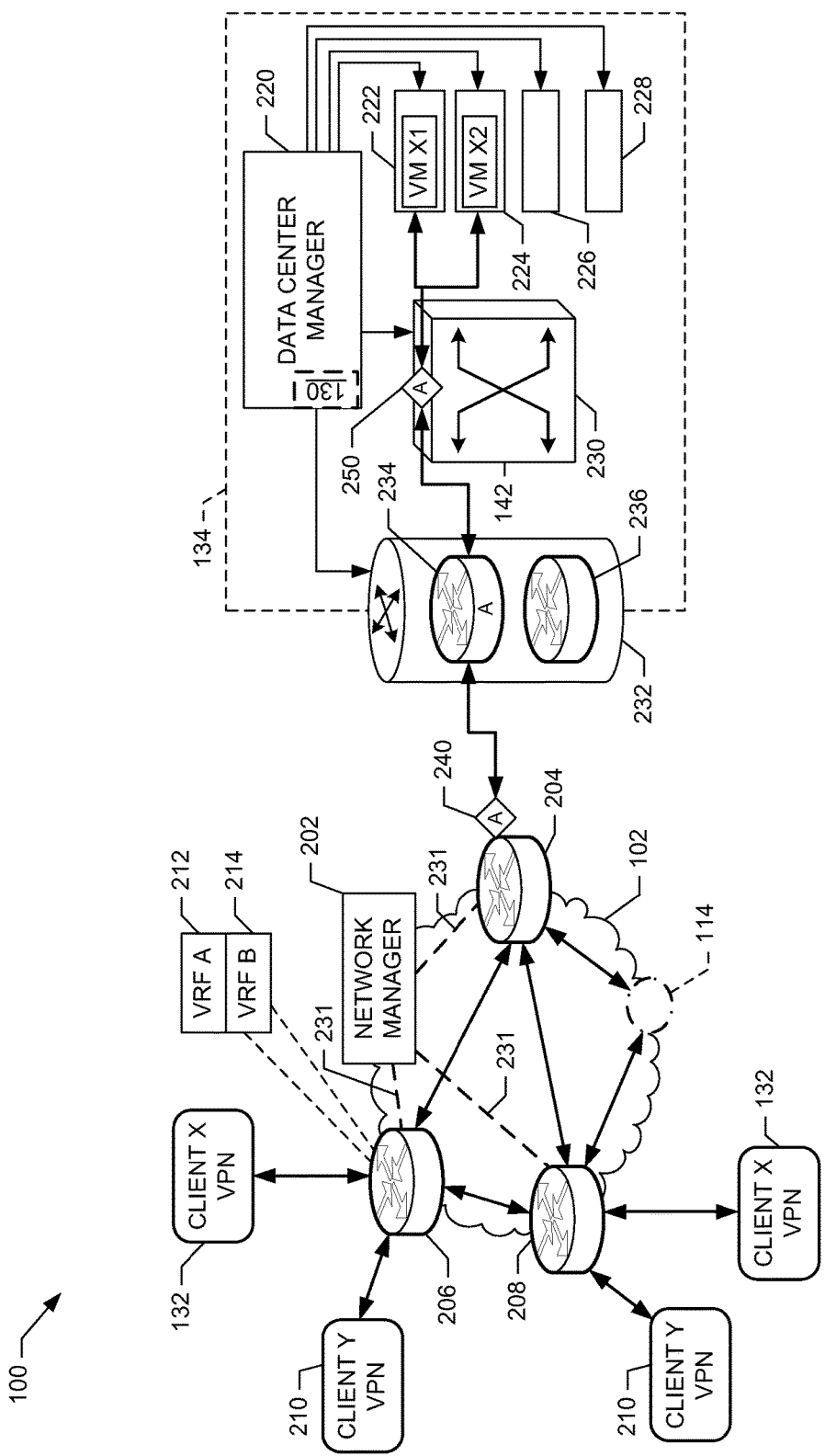
FIG. 2 is a schematic illustration of the example communication system of FIG. 1 including client virtual private networks (VPNs) and a cloud computing data center.

FIG. 2 is another view of a portion of the example communication system 100 of FIG. 1. The IP network 102 of FIG. 2 includes multiprotocol label switching (MPLS) to implement a layer 3 VPN, a Virtual Private LAN Service (VPLS) to implement a Layer 2 VPN across a Wide Area Network (WAN), and/or any other type of switching service to implement a VPN. The IP network 102 of the illustrated example is managed by a network manager 202 that configures routing tables for routers 204-208. The example IP network 102 may include any type of network managed by a service provider for routing packet-based communications (e.g., data) between computing resources associated with client sites. In some examples, the IP network 102 may be implemented by multiple service providers.

The routers 204-208 of the illustrated example route packet-based communications between a wireless mobile network (see, for example, the wireless mobile network 104 of FIG. 1), the client VPN 132 and the cloud computing data center 134. In this illustrated example, the client VPN 132 is implemented at two different physical locations. Additionally, the illustrated example includes a second client VPN 210 associated with a Client Y. The example routers 204-208 may route other packet-based communications to and/or from other clients and/or customers (not shown) and other switching networks (not shown). The routers 204-208 may be provider edge (PE) routers that may be communicatively coupled to each other and/or the client VPNs 132 and 210 via any number and/or type(s) of communication paths that allow any particular router 204-208 to communicate with at least some and/or all of the other routers 204-208. Furthermore, each of the client VPNs 132 and 210 may include customer edge (CE) routers that may route packet-based communications between computing sources within the respective client VPNs 132 and 210.

Each of the example routers 204-208 of FIG. 2 has a VPN routing and forwarding (VRF) table for each of the client VPNs 132 and 210 coupled to the IP network 102. For example, for the client VPN 132, the routers 204-208 have a VRF table A 212. For the client VPN 210, the routers 204-208 have a VRF table B 214. For brevity, only the VRF tables A 212 and B 214 associated with the router 206 are shown. However, the routers 204 and 208 each have access to the VRF tables A 212 and B 214. The VRF tables A 212 and B 214 are used by the routers 204-208 to route and/or forward a packet received at a particular router 204-208 toward its final destination. In general, when a packet is received at the router 204-208 from a router associated with a particular VPN 132 and/or 210, the router 204-208 uses the final destination identified in the packet to perform a query of the VRF table associated with that VPN. Based on a result of the query, the routers 204-208 determine how the packet is to be routed or forwarded within the IP network 102 and/or delivered to a particular CE router within another VPN and/or client site.

For example, the VRF table A 212 may include routing instructions for transmitting communications associated with the client VPN 132 to either a VPMN via the interface 114 and/or the cloud computing data center 134 based on a destination IP address. In these examples, the VRF table A 212 extends the security provided by the client VPN 132 to the secure VPMN of the wireless mobile network 104 and/or secure VLANs within the cloud computing data center 134. In this manner, the example VRF table A 212 provides a virtual route, path, and/or tunnel through the public IP network 102 for communications associated with the Client X.

The example network manager 202 of FIG. 2 manages the VRF A 212 and/or the VRF B 214 of the routers 204-208 for the corresponding client VPNs 132 and 210. The example network manager 202 of the illustrated example includes a network configuration management system that configures and/or creates VRF tables for VPNs (e.g., to manage the control plane of the routers 204-208). Additionally, the network manager 202 of the illustrated example includes a route reflector, route server, and/or a route controller that writes and/or rewrites route targets associated with VPN routes so that a client VPN can be dynamically connected to a selected VRF table (e.g., to manage the route within the routers 204-208). In other examples, the route reflector, route server, and/or route controller may be separate from the network manager 202. In some examples, the network manager 202 pre-configures the routers 204-208 with one or more sets of VRF tables. The one of more sets of VRF tables may be unspecified and/or unused by the routers 204-208 until the network manager 202 selects a set to couple a client VPN to a virtual machine (e.g., virtual machine VM X1 222 in the cloud computing data center 134).

To illustrate, assume the network manager 202 receives routing instructions from the Client X administrator 122 regarding a new VPN X site. The network manager 202 updates (e.g., configures) the VRF A 212 to include the new VPN X site. The network manager 202 then rewrites route targets of the VRF A 212 of the routers 204-208 associated with routes of the client VPN 132 to dynamically couple the new VPN X site. The example network manager 202 may publish one or more interfaces associated with routers for forwarding packets to other switching network or cloud computing data centers. Additionally, the network manager 202 may be communicatively coupled to each of the routers 204-208 via any type of communication path that may include one or more intermediate networks and/or nodes as indicated by the dashed lines 231 in FIG. 2.

By sending, for example, Border Gateway Protocol (BGP) route advertisements, each of the example routers 204-208 of FIG. 2 publishes and/or exports information concerning routes advertised by CE router(s) within the client VPNs 132 and 210 and/or any VPMNs that are communicatively coupled to the routers 204-208. Thus, in the illustrated example isolation between the client VPNs 132 and 210 is achieved via VRF tables (e.g., the VRF A 212 and the VRF B 214), and/or import policies. Specifically, all routes of a particular VPN are tagged with a route target parameter and/or value associated with the VPN. For example, when the example router 206 sends a BGP advertisement containing information regarding routers within the client VPN 132 that is communicatively coupled to the router 206, the BGP advertisement includes a route target that is associated with the client VPN 132. Based on received BGP advertisements, the example routers 204-208 of FIG. 2 build, compile, update, maintain and/or construct a VRF table (e.g., the VRF A 212) for each VPN. Specifically, when the example routers 204-208 receive BGP advertisements tagged with a route target associated with a particular VPN, they import only those routes into the VRF table associated with that VPN, as dictated by the VPN's import policy.

In a similar manner, the example VPMN controller 116 of FIG. 1 may transmit BGP route advertisements to communicatively couple a VPMN to routes of a particular VPN. These BGP advertisements can include a route target that is associated with, for example, the client VPN 132 and/or a VPMN of the client VPN 132. Thus, the example routers 204-208 create a routing association between the VPN 132 and the corresponding VPMN in the wireless mobile network 104 of FIG. 1 via the respective VRF table A 212.

To facilitate sharing of routing information among the example routers 204-208, the example network manager 202 of FIG. 2 includes any number of route reflectors, route servers, intelligent route reflectors, and/or intelligent route service control points. Because not all of the example routers 204-208 are necessarily communicatively coupled in a full mesh topology (for example, when at least one router 204-208 does not have a direct communication path to another router 204-208), the example network manager 202 of FIG. 2 forwards BGP advertisements among the routers 204-208. By forwarding each received BGP advertisement, the example network manager 202 enables each of the routers 204-208 to build, compile and/or construct a VRF table for each VPN and/or VPMN that can be used by that router to route data from any CE router of a particular VPN and/or VPMN to any other CE router within the client VPNs 132 and/or 210, even if such routing of data requires use of one or more intervening routers 204-208.

In the example of FIG. 2, the communication system 100 includes the cloud computing data center 134 that is communicatively coupled to the IP network 102 via the router 204. The cloud computing data center 134 may include any type of virtualized network and/or elements such as servers that provide resources to clients and/or customers based on, for example, usage requirements, bandwidth, processor efficiency, etc. In some examples, the cloud computing data center 134 includes a cloud computing network. The example cloud computing data center 134 of FIG. 2 is managed by a data center manager 220 to control the creation, allocation, and/or distribution of resources within the cloud computing data center 134. The cloud computing data center 134 further includes servers 222-228 for hosting computing resources, a virtual local area network (VLAN) switch 230, a router 232 that includes logical routers 234 and 236, and virtual machines VM X1 and VM X2 hosted respectively by the servers 222 and 224. Each of the servers 222-228 may be located within a single site location or, alternatively, may be distributed at a plurality of site locations within the cloud computing data center 134. Additionally, the cloud computing data center 134 may include other routers, logical routers, servers, VLANs, and/or switching networks that may be distributed across one or more sites located at different physical locations.

The example communication system 100 of FIG. 2 shows the client VPN 132 communicatively coupled to virtual machines VM X1 and VM X2 within the cloud computing data center 134. The router 204 includes an interface 240 that communicatively couples the client VPN 132 to resources (e.g., the virtual machines VM X1 and VM X2) within the cloud computing data center 134. The interface 240 communicatively couples the client VPN 132 and/or a corresponding VPMN to the virtual machines VM X1 and VM X2 by remapping the route targets associated with the client VPN 132 and/or VPMN in the VRF A 212 to the virtual machines VM X1 and VM X2 and transmitting BGP advertisements to the routers 206 and 208 with the remapped route target. The interface 240 may be coupled to a VRF table which includes a routing entry that forwards packets from multiple destinations associated with the client VPN 132 and/or a corresponding VPMN to a single (or few) network locations within the cloud computing data center 134. The example router 204 may include additional interfaces and/or endpoints that reference other distributive computing networks and/or other switching networks.

The example VLAN switch 230 of FIG. 2 communicatively couples resources that may be distributed across two or more of the servers 222-228 and/or by isolating resources associated with different clients that may be shared on a single server. The VLAN switch 230 implements one or more VLANs that communicatively couples virtual machines to VPNs and/or VPMNs. For example, the virtual machines VM X1 and VM X2 may be a group of resources distributed across the servers 222 and 224. The example VLAN switch 230 couples the virtual machine VM X1 and VM X2 on the respective servers 222 and 224 together so that any computing resource within the client VPN 132 and/or the mobile device 106 via a VPMN may access an application, data, and/or a processing resource by accessing the virtual machine VM X1, VM X2, and/or a combination of the virtual machines VM X1 and VM X2.

The virtual machines VM X1 and/or VM X2 of the illustrated example may include any type of hardware virtual machine that may share underlying hardware resources with one or more resources operating a separate operating system. The virtual machines VM X1 and/or VM X2 may also include any type of application virtual machine that may operate different client applications on a single operating system. Each virtual machine VM X1 and/or VM X2 may be assigned an IP address (and/or IP address space) and/or a logical interface of each virtual machine may be assigned a media access control (MAC) address.

The example data center manager 220 assigns an IP address and/or an IP address space to each of the virtual machines VM X1 and/or VM X2 or, alternatively, may assign a single IP address and/or IP address space collectively to the virtual machines VM X1 and VM X2. Further, the data center manager 220 may assign resources, application types, application images, access control, bandwidth, operating system types, a server location, and/or any other type of cloud computing parameter to one or more servers 222-228 upon a request to provision and/or allocate resources from the client administrator 122 of FIG. 1. In other examples, the data center manager 220 may assign a MAC address to the virtual machines VM X1 and/or VM X2.

The data center manager 220 of the illustrated example also partitions resources within the edge router 232 by creating a logical router (e.g., the logical router 234). The logical router 234 functions as a customer edge router for the VPN within the cloud computing data center 134. In this manner, the client VPN 132 and/or VPMN of the client is communicatively coupled to resources in the cloud computing data center 134 so that traffic associated with the client VPN 132 and/or VPMN with destination addresses associated with the virtual machines VM X1 and/or VM X2 can reach these virtual machines. These destination addresses correspond to the IP addresses of the virtual machines VM X1 and VM X2 and/or may correspond to a MAC address assigned to an interface of the virtual machines VM X1 and VM X2. The logical router 234 may also include filtering and/or firewalling functions to restrict access to resources within the cloud computing data center 134. For example, the logical router 234 may include a source address filter so that only packets that include a source address associated with the client VPN 132 and/or a VPMN associated with the Client X via the interface 114 may be forwarded to the virtual machines VM X1 and VM X2.

The data center manager 220 of the illustrated example also updates VRF tables within the edge router 232 to include identification values of network paths within the VLAN switch 230 that correspond to routes to virtual machines VM X1 and VM X2. A VLAN controller may manage the physical and/or logical setup of a network path from the servers 222-228 to the corresponding logical routers 234 and 236. For example, a VLAN network path 250 from the virtual machine VM X1 may be assigned an identification value of PATH1. Further, the virtual machine VM X1 may be assigned an IP address ADDR01. The data center manager 220 creates a VRF table via the logical router 234 that indicates any packets originating from the client VPN 132 and/or a VPMN of the Client X via the interface 114 with a destination address of ADDR01 should be forwarded to the virtual machine VM X1 on the server 222 via the VLAN network path PATH1 250.

Figure 3:
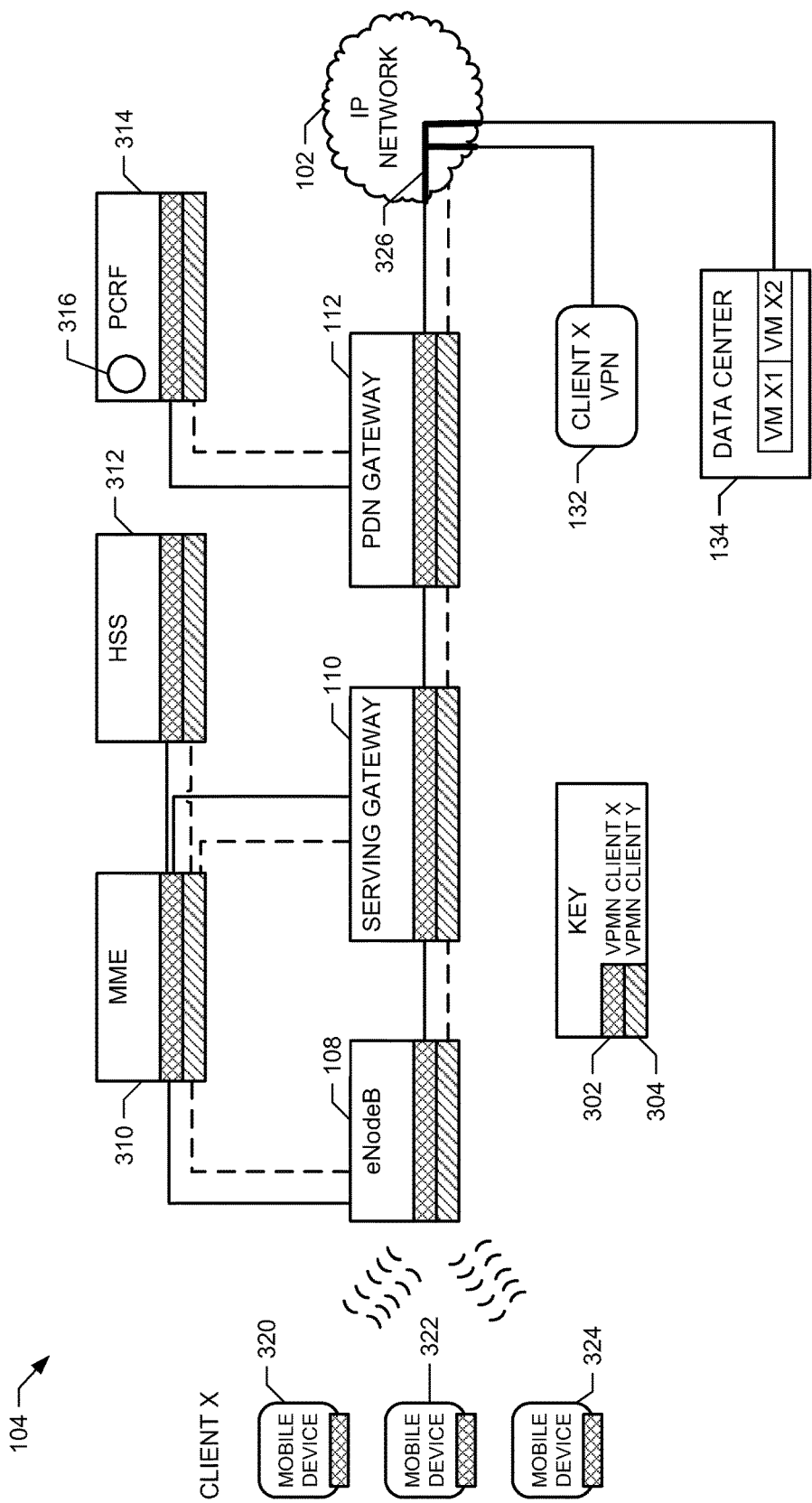
FIGS. 3-5 illustrate the example wireless mobile network of FIG. 1 with example virtual private mobile networks.
Figure 4:
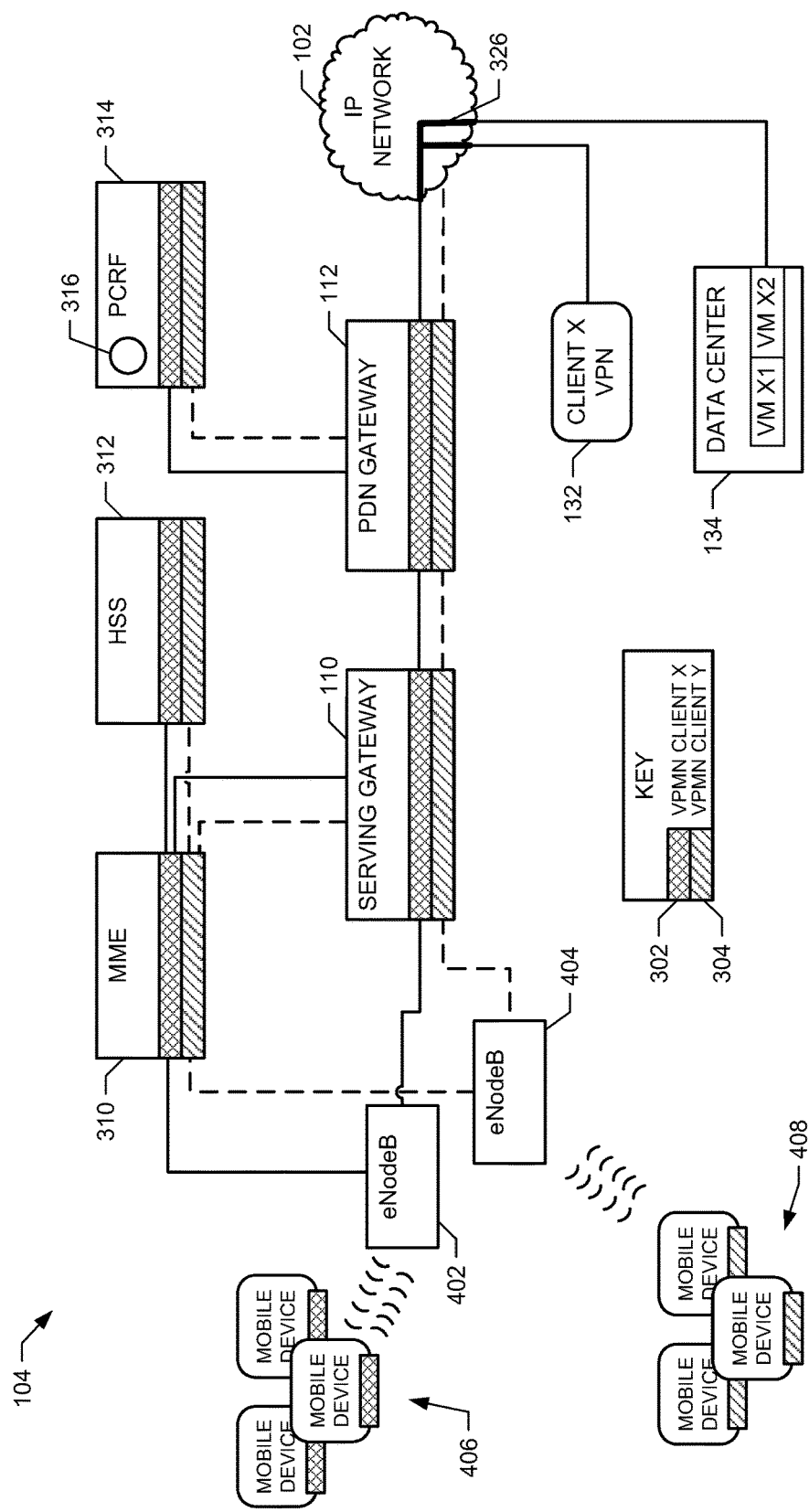

FIGS. 3 and 4 show the example wireless mobile network 104 of FIG. 1 with VPMNs 302 and 304. In these illustrated examples, the VPMN 302 is associated with and/or configured for the Client X associated with the client VPN 132 of FIGS. 1 and 2 and the VPMN 204 is designated for communications associated with the Client Y associated with the client VPN 210. In other examples, the wireless mobile network 104 may include additional VPMNs or fewer VPMNs and/or be associated with different clients and/or numbers of clients. For example, the wireless mobile network 104 can include a VPMN for the Client X for latency sensitive applications.

In the example of FIG. 3, the wireless mobile network 104 includes the network elements 108-112 of FIG. 1. Additionally, the wireless mobile network 104 includes an MME 310, an HSS 312, and a PCRF server 314. In other examples, the wireless mobile network 104 may include additional network elements and/or additional types of network elements.

The example MME 310 of FIG. 3 tracks and pages mobile devices that are communicatively coupled to the wireless mobile network 104. The example MME 310 may also activate and/or deactivate mobile devices and/or authenticate mobile devices attempting to connect to the wireless mobile network 104 by requesting user profile information from the HSS 312. In some examples, the MME 310 is configured to be similar to the servers 124 and 126 of FIG. 1 by selecting (e.g., via the VPMN controller 116) the appropriate serving gateway 110 and/or PDN gateway 112 when mobile devices provide an APN to connect to one of the VPMNs 302 and 304.

The example HSS 312 of FIG. 3 includes a database of subscription-related information (e.g., subscribing customer profiles). The example HSS 312 performs authentication and/or authorization of a mobile device attempting to access the wireless mobile network 104 by providing the MME 310 with mobile device profile information to match to profile information by the requesting mobile device. The HSS 312 may also include information about a geographic location of a subscribing customer and/or IP information associated with a mobile device of the customer.

The example PCRF server 314 of the illustrated example determines policy rules for the wireless mobile network 104. The example PCRF server 314 of FIG. 3 aggregates information to and/or from the wireless mobile network 104 and/or the network elements 108-112, 310, and 312 in real time to create rules. The example PCRF 314 may also store routing rules 316 that include identifiers and/or IP address space for coupling the VPMNs 302 and 304 to the respective client VPNs 132 and 210 and/or appropriate virtual machines via the VRF tables 212 and 214 included within the routers 204-208 of the IP network 102. Based on the created rules, the PCRF server 314 automatically makes intelligent policy decisions for each mobile device active on the wireless mobile network 104. In this manner, the PCRF server 314 enables a wireless mobile network provider to offer multiple services, quality of service (QoS) levels, and/or charging rules to facilitate mobile devices to connect to a VPN and/or virtual machine(s) of a client. Additionally, the PCRF server 314 may also broadcast and/or transmit the routing rules 316 to the portions of the network elements 108-112, 310 and 312 hosting the VPMNs 302 and 304 and/or to the routers 204-208 via the PDN gateway 112.

In the example of FIG. 3, the Client X requests the VPMN 302 from the VPMN controller 116 of FIG. 1 to enable mobile devices 320-324 to access enterprise applications and/or data managed by the Client X accessible via the IP network 102. The example Client X may also specify the routing rules 316.

In this illustrated example, the Client X requests that the VPMN 302 extend end-to-end of the wireless mobile network 104. As a result of the request, the VPMN controller 116 extends the VPMN 302 to all of the network elements 108-112 and 310-314 within the wireless mobile network 104. Additionally, the client coupler 130 extends the secure routing of the VPMN 302 through virtual routes 326 within the IP network 102 to the client VPN 132 and appropriate virtual machines within the cloud computing data center 134. In other examples, the Client X may only request and/or may only be able to request a VPMN to be setup on some of the network elements 108-112 and 310-314. By requesting the VPMN 302, the example VPMN controller 116 identifies available space within the network elements 108-112 and 310-314 and allocates control and/or data planes of the network elements 108-112 and 310-314 for the VPMN 302. The VPMN controller 116 then configures the allocated control and/or data plane portions of the network elements 108-112 and 310-314 for the VPMN 302.

To configure the network elements 108-112 and 310-314, the example VPMN controller 116 of FIG. 1 assigns an APN to the VPMN 302 and updates a control plane of the network elements 108 and 310-314 with the APN assignment. In some examples, the VPMN controller 116 also assigns and/or configures specific interfaces, switches, and/or processors within the network elements 108-112 and 310-314 to host the VPMN 302. Further, the client coupler 130 of the illustrated example communicatively couples the VPMN 302 to virtualized routes within the IP network 102 via, for example, the interface 114 of FIGS. 1 and 2.

In the illustrated example, the mobile devices 320-324 use the assigned APN to access the respective VPMN 302. Further, by using the APN, the network elements 108-112 and 310-314 may propagate communications within the VPMN 302 until an end point is reached. By using APNs, the VPMN controller 116 of the illustrated example creates exclusive virtual circuits (e.g., MPLS paths) from the eNodeB 108 to the PDN gateway 112 for routing communications within the VPMN 302 for the mobile devices 320-324 registered with the Client X. These exclusive virtual circuits are coupled to exclusive virtual routes 326 specified within the IP network 102 via BGP advertisements updating router VRF tables. Thus, communications from the mobile devices 320-324 of the illustrated example are routed securely through the wireless mobile network 104 via the VPMN 302 to the client VPN 132 and/or the virtual machines VM X1 and VM X2.

Further, the example VPMN 302 partitioned within the network elements 310-314 of FIG. 3 enables access control, authentication, mobile device profile management, routing rules, latency sensitive identifiers, and/or network rules to be configurable for the Client X. Thus, subscriber information for the Client X within the HSS 312 is separate from subscriber information associated with other VPMNs (not shown) and/or subscribers that use non-VPMN portions of the network elements 108-112 and 310-314. The separation of the control and/or data planes of the network elements 310-314 via the VPMN 302 also enables the Client X to provide different types of services (e.g., routing of communications that are latency sensitive) using the same network elements 108-112 and 310-314. Further, the separation of the control and/or data planes of the network elements 310-314 via the VPMN 302 prevents security issues in, for example, the VPMN 304 from propagating to other portions of the network elements 108-112 and 310-314 and/or the VPMN 302.

FIG. 4 shows the example wireless mobile network 104 of FIGS. 1 and 3 with the example VPMNs 302 and 304. In the example of FIG. 4, the eNodeB 108 is replaced with eNodeBs 402 and 404. The example eNodeB 402 is communicatively coupled to the example VPMN 302 and the example eNodeB 404 is communicatively coupled to the example latency VPMN 304. Thus, FIG. 4 shows that each of the VPMNs 302 and 304 can be communicatively coupled to the physically separate eNodeBs 402 and 404, which are both coupled to respective portions of the serving gateway 110.

The eNodeBs 402 and 404 of the illustrated example are physically separate to create isolation in a wireless spectrum between the VPMNs 302 and 304. Thus, the mobile devices 406 provisioned for the VPMN 302 are communicatively coupled to the example eNodeB 402 and mobile devices 408 provisioned for the VPMN 304 are communicatively coupled to the example eNodeB 404. This configuration enables the mobile devices 406 to securely access data and/or applications at the client VPN 132 and/or the virtual machines VM X1 and VM X2 at the data center 134 via the virtual route 326.

Figure 5:
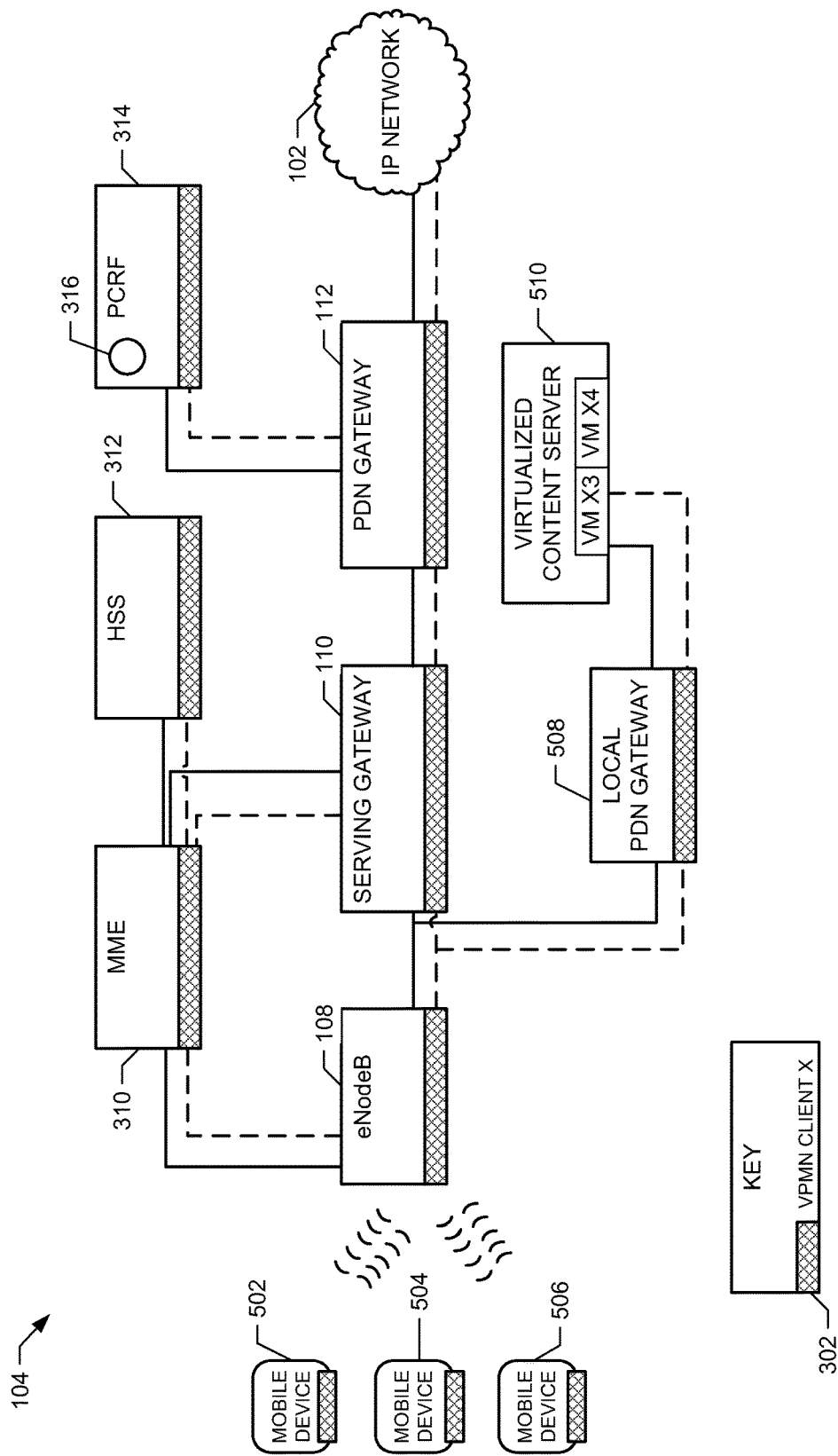

FIG. 5 illustrates the example wireless mobile network 104 of FIGS. 1, 3, and 4 with the example VPMN 302. In the example of FIG. 5, a network provider routes and/or processes communications from mobile devices (e.g., mobile devices 502-506) via the example network elements 108-112 and 310-314 through the VPMN 302). The network provider uses the example VPMN 302 to route and/or process sensitive enterprise communications separate from other communications. Thus, in this example, the example VPMN 302 is logically partitioned within the network elements 108-112 and 310-314 separate from non-VPMN portions of the network elements 108-112 and 310-314.

In the illustrated example, the example mobile devices 502-506 are communicatively coupled to the wireless mobile network 104 via the VPMN 302 provisioned within the network elements 108-112 and 310-314. In this example, the mobile devices 502-506 are identified as being associated with the Client X.

The example of FIG. 5 also includes a local PDN gateway 508 (e.g., mobility data center) and a communicatively coupled virtualized content server 510. The example local PDN gateway 508 is included within the example wireless mobile network 104 and communicatively coupled to the serving gateway 110. Additionally, the VPMN 302 is provisioned within the local PDN gateway 508 to enable the wireless devices 502-506 to access the virtualized content server 510.

In the example of FIG. 5, the local PDN gateway 508 is utilized within the example wireless mobile network 104 to reduce propagation times of communications between, for example, the mobile devices 502-506 and the virtualized content server 510. In some wireless networks, the example PDN gateway 112 can be located thousands of miles from the serving gateway 110. Thus, the mobile devices 502-506 that communicate with entities reachable via the IP network 102 may have to transmit communications a thousand miles to reach the PDN gateway 112 and possibly another thousand miles to reach the cloud computing data center 124 of FIGS. 1 and 2 and/or the client VPN 132. The example local PDN gateway 508 is deployed relatively physically close to the virtualized content server 510, thereby reducing communication propagation times between the mobile devices 502-506 and the server 510.

In the example of FIG. 5, the local PDN gateway 508 includes some or all of the functions of the PDN gateway 112, as described in conjunction with FIG. 1. However, because the local PDN gateway 508 processes relatively fewer communications targeted only for the virtualized content server 510 (and/or a group of physically close content servers), the example local PDN gateway 508 may have less processing capacity than the PDN gateway 112. In this example, the example serving gateway 110 receives communications from the mobile devices 502-504, determines the communications are addressed to the virtualized content server 510, and routes the communications to the local PDN gateway 508.

In some examples, the VPMN 302 hosted on the local PDN gateway 508 is configured with a protocol to offload processing functions from the mobile devices 502-506 for applications retrieving content from the virtualized content server 510. In such examples, the VPMN 302 hosted on the local PDN gateway 508 reduces latency with the mobile device 506 by processing relatively high volumes of data and/or communications from the virtualized content server 510 and transmitting the results of the processing to the mobile device 506.

In the illustrated example, the virtualized content server 510 includes the virtual machines VM X3 and VM X4 provisioned for the Client X. The virtual machines VM X3 and VM X4 are similar to the virtual machines VM X1 and VM X2 of FIGS. 2-4. In such examples, the client administrator 122 of FIG. 1 requests that the virtualized content server 510 is to host the virtual machines VM X3 and VM X4 so that the mobile devices 502-506 can access locally stored enterprise applications and/or data without having to access the virtual machines VM X1 and VM X2 via the IP network 102. Thus, the example virtualized content server 510 functions as a local smaller version of the cloud computing data center 134 of FIGS. 1-4.

In other examples, the mobile devices 502-506 access the virtual machines VM X3 and VM X4 for latency sensitive communications and the virtual machines VM X1 and VM X2 for non-latency sensitive communications. In yet other examples, the mobile devices 502-506 access the virtual machines VM X3 and VM X4 when the mobile devices 502-506 are physically close to the virtualized content server 510 and access the virtual machines VM X1 and VM X2 during other instances. In these other examples, the virtualized content server 510 provides local access to enterprise applications and/or data when access to the IP network 102 is unavailable and/or inefficient.

Figure 6:
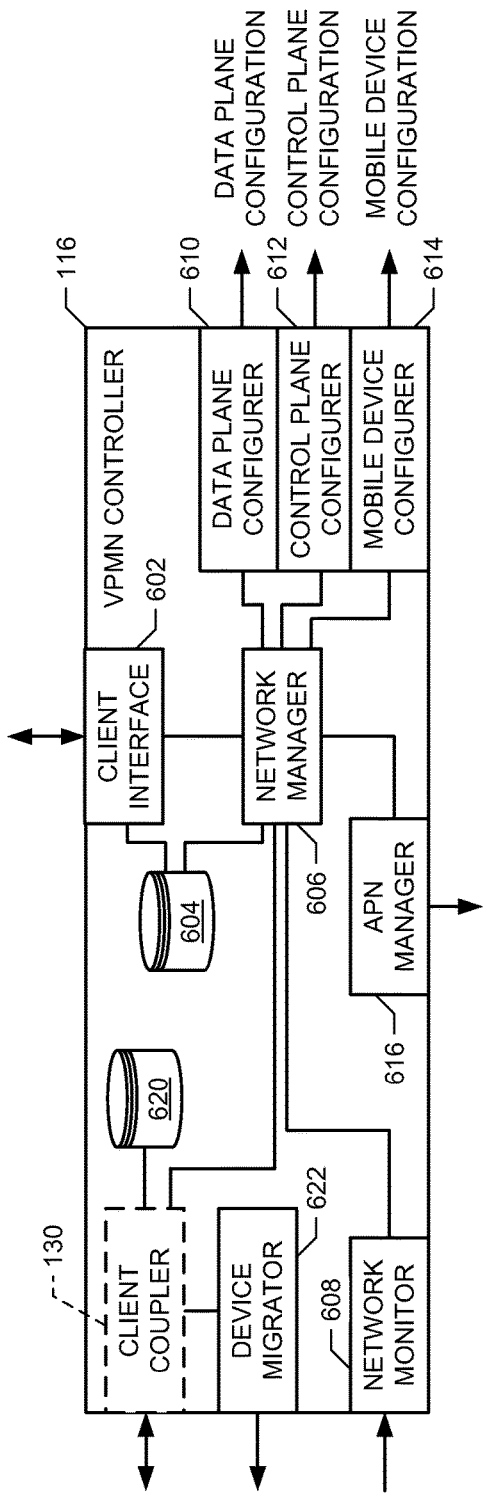
FIG. 6 illustrates of the example virtual private mobile network controller including a client coupler of FIGS. 1 and 2.

FIG. 6 illustrates the example VPMN controller 116 and the client coupler 130 of FIG. 1. The VPMN controller 116 and/or the client coupler 130 of the illustrated example are included within a controller, server, processor, and/or computing center of a wireless mobile network provider. In some examples, the VPMN controller 116 and/or the client coupler 130 are included within a data plane and/or control plane allocation controller of a wireless mobile network provider.

To receive requests and/or routing rules from clients (e.g., the client administrator 122 of FIG. 1) to couple VPMNs to VPNs and/or cloud computing data centers, the example VPMN controller 116 of the illustrated example includes a client interface 602 (e.g., the MaaS portal 120). The example client interface 602 provides a framework that enables clients to request a VPMN by selecting, for example, bandwidth requirements, geographic location, wireless spectrum frequencies, and/or which types of network elements are to host a VPMN. Some example request(s) also include client administrative information including billing information, profile information, network addresses, etc. In some examples, the client interface 602 is a web-based API interface that provides options and/or templates that clients can select to request a VPMN and/or specify IP address space for coupling a VPMN to a VPN and/or virtual machines. In other examples, the client interface 602 includes a phone-request system and/or a form request system.

After receiving a request from a client for a VPMN, the client interface 602 creates a client account that includes the information provided by the client. The client interface 602 stores the client account to a client records database 604. In some examples, the HSS 312 of FIGS. 3 and 4 accesses the client records database 604 for client profile information for security authentication and/or authorization. In some examples, the client records database 604 is implemented by Electronically Erasable Programmable Read-Only Memory (EEPROM), Random Access Memory (RAM), Read-Only Memory (ROM), and/or any other type of memory.

The example client interface 602 may also assign one or more APNs to a VPMN requested by a client. The client interface 602 may store the APN(s) to the client account in the client records database 604. Additionally, the client interface 602 may transmit the APN(s) and/or any information associated with a newly created VPMN to the client.

To manage the creation and/or management of VPMNs, the VPMN controller 116 of FIG. 6 includes a network manager 606. The example network manager 606 uses the information provided by the client to create a VPMN. To determine which network elements will host the VPMN, the network manager 606 receives a status of the wireless mobile network 104 via a network monitor 608.

The example network monitor 608 of the illustrated example scans the wireless mobile network 104 to determine network traffic conditions, bandwidth usage, and/or any QoS issues. In some examples, the network monitor 608 maintains a history of network performance based on detected network conditions. In some such examples, the network monitor 608 also determines an amount of available capacity and/or bandwidth within network elements (e.g., the network elements 108-112, 310-314, 402, and 404 of FIGS. 1-4).

The example network manager 606 of FIG. 6 uses the information from the network monitor 608 to identify available network elements to host a VPMN. The network manager 606 of the illustrated example also uses information associated with other client VPMNs stored in the client records database 604 to determine if there is available capacity within the identified network elements based on already licensed VPMN usage. If there is no additional capacity for another VPMN, the network manager 606 identifies other available network elements.

For each of the network elements with available capacity, the network manager 606 allocates a portion of a control plane and/or a data plane. In some examples, the network manager allocates a data plane by allocating a portion of a wireless spectrum of one or more eNodeBs for a VPMN. The network manager 606 of the illustrated example also allocates a data plane by partitioning a portion of a switch within for example, the gateways 110 and 112 for network traffic associated with a VPMN. In some examples, the network manager 606 allocates a data plane by designating certain interfaces of a switch and/or a router for a VPMN.

After allocating data plane space to network elements, the network manager 606 sends an instruction to a data plane configurer 610 to configure a data plane on the allocated portions of the identified network elements.

The example network manager 606 allocates a control plane by, for example, designating a portion of IP address space that is to be associated with a VPMN. The portion of the IP address space may be referenced to an assigned APN. In some examples, the network manager 606 also partitions a control plane of a network element by virtualizing functionality of the network element specifically designated for a VPMN. In some such examples, the example network manager 606 allocates a control plane by partitioning portions of databases and/or servers (e.g., the MME 310, HSS 312, and/or the PCRF server 314) to store information associated with clients and/or subscribing customers of a VPMN and/or routing rules. After allocating control plane space to network elements, the network manager 606 sends an instruction to a control plane configurer 612 to configure a control plane on the allocated portions of the identified network elements.

By allocating portions of a data plane and/or a control plane, the example network manager 606 may also specify a virtual circuit (and/or other type of private path such as, for example, a MPLS path) to be implemented within a VPMN extending through, for example, the interface 114 to virtual routes within the IP network 102. To specify a virtual circuit, the network manager 606 identifies outgoing and/or incoming interfaces of the network elements associated with the VPMN and/or IP address space allocated to the VPMN. The example network manager 606 then links together the interfaces, routers, switches, interfaces, and/or connections based on the identified information to create the virtual circuit and updates routing and/or forwarding tables within the corresponding network elements. Thus, any communications associated with a VPMN are transmitted between the VPMN allocated portions of the network elements and/or to the routers 204-208 within the IP network.

Additionally, the network manager 606 may determine if separate eNodeBs are to be used for each VPMN (as described in conjunction with FIG. 4). If multiple eNodeBs are to be utilized, the client interface 602 receives parameters associated with the eNodeB. The network manager 606 uses the parameters and/or an assigned APN to associate the VPMN to an eNodeB. A mobile device configurer 614 and/or an APN manager 616 may then configure the eNodeB to be communicatively coupled to one or more serving gateways that have partitioned space for the VPMN.

To configure a VPMN on a data plane of network elements, the example VPMN controller 116 of FIG. 6 includes the data plane configurer 610. The example data plane configurer 610 provisions a VPMN on portions of network elements identified by the network manager 606 and/or the client coupler 130. The example data plane configurer 610 of FIG. 6 configures and/or provisions a VPMN by designating, for example, frequencies of a wireless spectrum provided by an eNodeB for a VPMN.

In some examples, the data plane configurer 610 also designates portions of a server and/or a router (e.g., the gateways 110 and/or 112) for hosting the VPMN. In some such examples, the example data plane configurer 610 also creates a virtual circuit (e.g., MPLS path) for a VPMN by updating routing and/or forwarding tables of network elements based on information from the network manager 606. In some examples, the data plane configurer 610 also dynamically changes an amount of bandwidth and/or processing capacity provisioned for a VPMN based on instructions from the network manager 606.

In some such examples, the network manager 106 receives an indication from the network monitor 608 that a VPMN on a serving gateway is operating close to provisioned capacity. In some examples, the network manager 106 increases data plane space for the VPMN by instructing the data plane configurer 610 to provision additional interfaces, links, circuitry, and/or processing capacity of the serving gateway for the VPMN. Thus, the data plane configurer 610 enables a VPMN to be dynamically provisioned based on current, future, and/or predicted network traffic conditions.

To configure a VPMN on a control plane of network elements, the example VPMN controller 116 of FIG. 6 includes the control plane configurer 612. The example control plane configurer 610 provisions a VPMN on portions of network elements identified by the network manager 606 and/or the client coupler 130. The control plane configurer 610 of the illustrated example configures a VPMN in a control plane of a network element by updating routing and/or forwarding tables with an IP address space and/or an APN for communications associated with a VPMN.

In some examples, the control plane configurer 612 of FIG. 6 provisions portions of a database storing client profile information and/or subscriber profile information so that the information is only accessible via a VPMN. In other examples, the control plane configurer 612 updates network elements with specialized service information for a VPMN. Thus, the control plane configurer 612 ensures that client and/or subscribing customer information associated with different VPMNs can be stored on the same network element so that the information is only accessible to entities and/or network elements associated with the corresponding VPMN.

To update mobile devices with information, thereby enabling the mobile devices to communicatively couple to a VPMN, the example VPMN controller 116 of FIG. 6 includes a mobile device configurer 614. The example mobile device configurer 614 installs functionality, codes, connectivity, etc. to a mobile device (e.g., the mobile device 402) to enable the mobile device to connect to a VPMN. In some such examples, the mobile device configurer 614 transmits an APN associated with a VPMN to corresponding mobile devices. In some examples, the example mobile device configurer 614 also transmits mobile device information and/or client profile information to network elements to enable the network elements to authorize and/or authenticate a mobile device connecting to a VPMN. In other examples, a client (e.g., an MVNO) pre-configures a mobile device with functionality to connect to a VPMN prior to providing the mobile device to a subscribing customer.

To propagate an APN assigned to a VPMN to network elements, the example VPMN controller 116 of the illustrated example includes an APN manager 616. The example APN manager 616 receives an APN assigned to a VPMN by the network manager 606 and transmits the APN to network elements that have a portion of a control and/or a data plane partitioned for an associated VPMN. In some such examples, the APN manager 616 transmits an APN to the HSS 312 and/or the MME 310, thereby enabling the MME 310 to determine to which VPMN on the serving gateway 110 communications from a mobile device are to be routed. Additionally or alternatively, the APN manager 616 may transmit an assigned APN to the APN DNS servers 124 and 126 of FIG. 1. In examples where more than one APN is associated with a client, the APN manager 616 transmits the appropriate APN to network elements. Further, the APN manager 616 may update APNs stored on the network elements as the APNs are updated by the VPMN controller 116.

To communicatively couple VPMNs to client VPNs and/or virtual machines in cloud computing data centers, the example VPMN controller 116 of FIG. 6 includes the client coupler 130. The example client coupler 130 receives instructions from, for example, the client interface 602 that a VPMN provisioned for a client is to be coupled to a VPN of the client and/or virtual machines provisioned for the client. The instructions can include an IP address space of the client VPN, and IP address space of virtual machines, and/or any other identifier of the virtual machines within, for example, the cloud computing data center 134. In other examples, client administrators can provide coupling instructions directly to the client coupler 130 via an API interface.

While the example client coupler 130 of the illustrated example is included within the VPMN controller 116, in other examples, the client coupler 130 may be external and communicatively coupled to the VPMN controller 116. For example, the client coupler 130 may be implemented within the network elements 108-112 and 310-314 and/or may be a separate processor within the wireless mobile network 104. In yet other examples, at least some portions of the client coupler 130 can be implemented within the data center manager 220.

In response to be instructed to couple a VPMN, the example client coupler 130 couples the VPMN to a virtual machine within the cloud computing data center 134 by transmitting BGP advertisements to, for example, the routers 204-208 and 232 to update VRF tables. These BGP advertisements cause the routers 204-208 and 232 to associate communications corresponding to a VPMN with, for example, the virtual route 326 connected to virtual machines within the cloud computing data center 134. This virtual route includes path(s) through the IP network and VLAN paths through the VLAN switch 230. The updating of the VRF tables causes the routers 204-208 and 232 to transmit securely communications received from the interface 114 of a VPMN with a destination address of a virtual machine through the IP network 102 along the virtual route 326. In other examples, the client coupler 130 updates VRF tables of the routers 204-208 and 232 via other routing update protocols and/or messages.

The example client coupler 130 of FIG. 6 also updates the VRF tables of the routers 204-208 to associate a VPMN with an address space of a client. The client coupler 130 transmits BGP advertisements to the routers 204-208 that cause the routers 204-208 to make an association between a client VPN and the corresponding VPMN. In other examples, the client coupler 130 transmits a coupling message to the network manager 202 of FIG. 2, thereby causing the network manager 202 to transmit the BGP advertisements. In yet other examples, the client coupler 130 updates VRF tables of the routers 204-208 and 232 via other routing update protocols and/or messages.

By updating the VRF tables of the routers 204-208 and 232, the example client coupler 130 creates a virtual network exclusive for a client extending from the wireless mobile network 104 through the IP network 102 to enterprise VPNs of the client and virtual machines remotely located from the VPN of the client. This exclusive network enables mobile uses associated with an enterprise client to seamlessly and securely access applications and/or data available to uses within the VPN of the client, thereby enabling the client to become more mobile. This also enables clients to deploy mobile-orientated applications in cloud environments to enable wireless devices located anywhere in the world to securely access the applications and/or data. Further, the client coupler 130 enables client mobile devices to securely access data and/or applications hosted by the client.

The example client coupler 130 uses a database 620 to manage which VPMNs are coupled to which client VPNs and/or virtual machines. For example, upon coupling a VPMN to a VPN and/or virtual machines, the client coupler 130 creates a record within the database 620 describing which APNs and/or address space of a VPMN is coupled to which address space of a VPN and/or MACs address and/or address space of virtual machines. The client coupler 130 of the illustrated example also includes within the record an address of the edge router 232 of the cloud computing data center 134 and/or contact information of administrators of the data center manager 220. In this manner, the client coupler 130 can contact the cloud computing data center 134 (e.g., when the data center 134 is operated by an entity separate from the VPMN).

In some examples, the database 620 of FIG. 6 is also accessible by clients to update address space associated with VPNs and/or assigned to virtual machines. Additionally, clients can specify new virtual machines to couple to a VPMN and/or specify which VPMNs are accessible to which virtual machines. The database 620 of FIG. 6 may be implemented by Electronically Erasable Programmable Read-Only Memory (EEPROM), Random Access Memory (RAM), Read-Only Memory (ROM), and/or any other type of memory.

The example client coupler 130 of FIG. 6 couples a VPMN on local PDN gateways (e.g., mobility data centers) to, for example, the virtualized content server 510 of FIG. 5. To select the local PDN gateway, the client coupler 130 of the illustrated example determines a geographic location of a destination address of the virtualized content server 510 and determines which local PDN gateway is relatively close. In other examples, the client coupler 130 couples a VPMN to frequently accessed and/or utilized local PDN gateways.

In examples where mobile devices are attempting to access a client VPMN, VPN and/or virtual machines, the example client coupler 130 instructs a device migrator 622 to communicatively couple the mobile device to the VPMN. The device migrator 622 of the illustrated example operates in conjunction with the network elements 310-314 to validate the credentials of the mobile device to determine the mobile device is authorized to access the VPMN, the VPN, and/or the virtual machines. The example device migrator 622 may use, for example, over the air programming via the serving gateway 110, the HSS 312, the MME 310 and/or the eNodeB 108 to provision a SIM card of a mobile device to communicatively couple the mobile device to the VPMN. In this example, the device migrator 622 determines an APN to provision the SIM card by accessing the APN manager 616. In other examples, the device migrator 622 may determine an APN for the VPMN from a network provider and/or a client administrator. In other examples, the example client coupler 130 instructs the APN manager 616 to communicatively couple a mobile device to the VPMN.

While the example VPMN controller 116 and/or the client coupler 130 has been illustrated in FIG. 6, one or more of the servers, platforms, interfaces, data structures, elements, processes and/or devices illustrated in FIG. 6 may be combined, divided, re-arranged, omitted, eliminated and/or implemented in any way. Further, the example client interface 602, the example client resource database 604, the example network manager 606, the example network monitor 608, the example data plane configurer 610, the example control plane configurer 612, the example mobile device configurer 614, the example APN manager 616, the example client coupler 130, the example database 620, the example device migrator 622, and/or more generally, the example VPMN controller 116 may be implemented by hardware, software, firmware and/or any combination of hardware, software and/or firmware. Thus, for example, any of the example client interface 602, the example client resource database 604, the example network manager 606, the example network monitor 608, the example data plane configurer 610, the example control plane configurer 612, the example mobile device configurer 614, the example APN manager 616, the example client coupler 130, the example database 620, the example device migrator 622 and/or more generally, the example VPMN controller 116 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example client interface 602, the example client resource database 604, the example network manager 606, the example network monitor 608, the example data plane configurer 610, the example control plane configurer 612, the example mobile device configurer 614, the example APN manager 616, the example client coupler 130, the example database 620, and/or the example device migrator 622 are hereby expressly defined to include a computer readable medium such as a memory, DVD, CD, etc. storing the software and/or firmware. Further still, the example VPMN controller 116 and/or the client coupler 130 may include one or more elements, processes and/or devices in addition to, or instead of, those illustrated in FIG. 6, and/or may include more than one of any or all of the illustrated elements, processes and devices.

Figure 7:
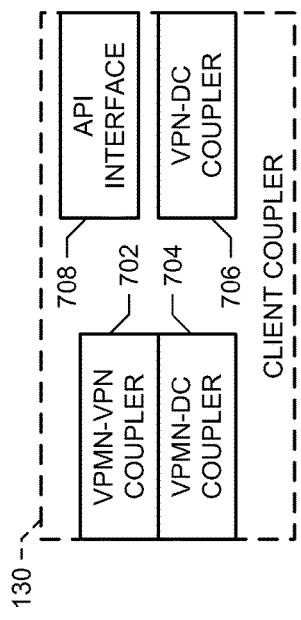
FIG. 7 illustrates an example implementation of the example client coupler of FIGS. 1, 2, and 6.

FIG. 7 illustrates the example client coupler 130 of FIGS. 1, 2, and 6. To couple VPMNs to a client VPN, the client coupler 130 includes a VPMN-VPN coupler 702. The example VPMN-VPN coupler 702 determines which VPMN and VPN are to be coupled within the IP network 102 and transmits BGP advertisements and/or messages to update VRF tables within, for example, the routers 204-208. In some examples, VPMN-VPN coupler 702 also updates VRF tables of edge routers at the VPN of the client. Further, the example VPMN-VPN coupler 702 of FIG. 7 manages which VPMNs of a client are to be coupled to which client VPNs.

To communicatively couple VPMNs to virtual machines within a cloud computing data center, the example client coupler 130 includes a VPMN-DC coupler 704. The example VPMN-DC coupler 704 determines which VPMN and virtual machines are to be coupled within a cloud computing data center and transmits BGP advertisements and/or messages to update VRF tables within, for example, the routers 204-208 and 232. In some examples, the VPMN-DC coupler 704 also transmits messages to the cloud computing data center 134 to communicatively couple VLAN paths within the data center from virtual machines to, for example, the edge router 232. In this manner, the example VPMN-DC coupler 704 instructs the cloud computing data center 134 to communicatively couple the virtual machines to virtual routes external to the data center 134.

In some examples, the VPMN-DC coupler 704 is included within the data center manager 220 of FIG. 2. In such examples, the client coupler 130 of FIGS. 6 and 7 sends instructions to the VPMN-DC coupler 704 to couple the appropriate virtual machines to the appropriate logical routers 234 and 236 within the edge router 232. In these examples, the VPMN-DC coupler 704 also transmits BGP advertisements to the routers 204-206 within the IP network 102, thereby updating VRF tables to couple the virtual machines to a virtual route connected to a VPMN.

To communicatively couple a client VPN to virtual machines, the example client coupler 130 includes a VPN-DC coupler 706. The example VPN-DC coupler 706 receives instructions from, for example, the client administrator 122 and transmits BGP advertisements to the routers 204-208 to update VRF tables. While the example VPN-DC coupler 706 is shown as being included within the client coupler 103, in other examples the VPN-DC coupler 706 is be included within the data center manager 220 of FIG. 2. In these other examples, the data center manager 220 and the VPMN controller 116 of FIG. 6 are managed by the same wireless network provider.

To couple a client VPN to a virtual machine, the example VPN-DC coupler 706 assigns a VLAN path to the virtual machine within the cloud computing data center 134 a VLAN identifier. The example VPN-DC coupler 706 then updates a VRF table within the edge router 232 with the IP address space of the virtual machine, a VPN identifier of the client VPN, and/or the VLAN identifier. The example VPN-DC coupler 706 then assigns the VLAN identifier to a network interface of the virtual machine. The example VPN-DC coupler 706 creates a BGP and/or an external BGP session between the edge router 232, the routers 204-208, and edge routers of the client VPN to update VRF tables, thereby coupling the virtual machine to the client VPN.

To enable client administrators to provide coupling information and/or create, modify, and/or deploy enterprise applications, the example client coupler 130 includes an API interface 708. The example API interface 708 includes a web-based interface that enables client administrators to specify which VPMNs are to be coupled to which client VPNs and/or virtual machines. The client administrators can identify VPMNs, VPNs, and/or virtual machines via address space, identifiers, MAC addresses, etc. In some examples, the API interface 708 is integrated with the client interface 602 of FIG. 6.

The example API interface 708 of FIG. 7 also enables client administrators to develop, deploy, and/or modify enterprise applications through a MPaaS. This enables clients to utilize virtual machines within the cloud computing data center 134 to deploy their own services (e.g., a service deployment platform configured for mobility and cloud computing environments) and use the security of the virtual routes coupling these virtual machines to VPMNs and VPNs to provide custom control capabilities. In some examples, the client administrators have third parties develop and/or deploy the applications within the virtual machines.

While the example client coupler 130 has been illustrated in FIG. 7, one or more of the servers, platforms, interfaces, data structures, elements, processes and/or devices illustrated in FIG. 7 may be combined, divided, re-arranged, omitted, eliminated and/or implemented in any way. Further, the example VPMN-VPN coupler 702, the example VPMN-DC coupler 704, the example VPN-DC coupler 706, the example API interface 708, and/or more generally, the example client coupler 130 may be implemented by hardware, software, firmware and/or any combination of hardware, software and/or firmware. Thus, for example, any of the example VPMN-VPN coupler 702, the example VPMN-DC coupler 704, the example VPN-DC coupler 706, the example API interface 708, and/or more generally, the example client coupler 130 could be implemented by one or more circuit(s), programmable processor(s), application specific integrated circuit(s) (ASIC(s)), programmable logic device(s) (PLD(s)) and/or field programmable logic device(s) (FPLD(s)), etc.

When any apparatus claim of this patent is read to cover a purely software and/or firmware implementation, at least one of the example VPMN-VPN coupler 702, the example VPMN-DC coupler 704, the example VPN-DC coupler 706, and/or the example API interface 708 are hereby expressly defined to include a computer readable medium such as a memory, DVD, CD, etc. storing the software and/or firmware. Further still, the example client coupler 130 may include one or more elements, processes and/or devices in addition to, or instead of, those illustrated in FIG. 7, and/or may include more than one of any or all of the illustrated elements, processes and devices.

Figure 8A:
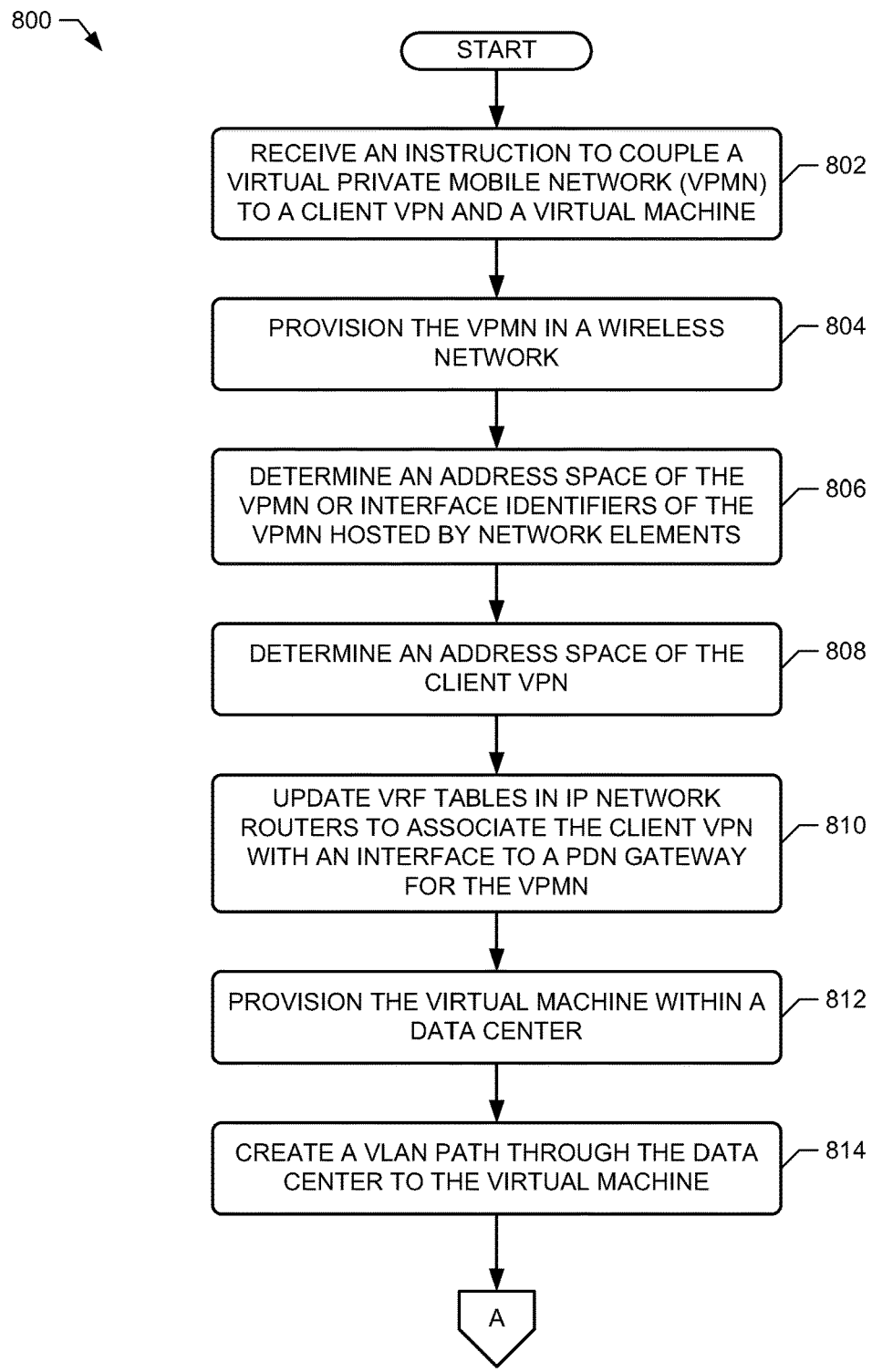
FIGS. 8A, 8B, and 9 are flowcharts representative of example machine-accessible instructions, which may be executed to implement the virtual private mobile network controller and/or the client coupler of FIGS. 1-7.
Figure 8B:
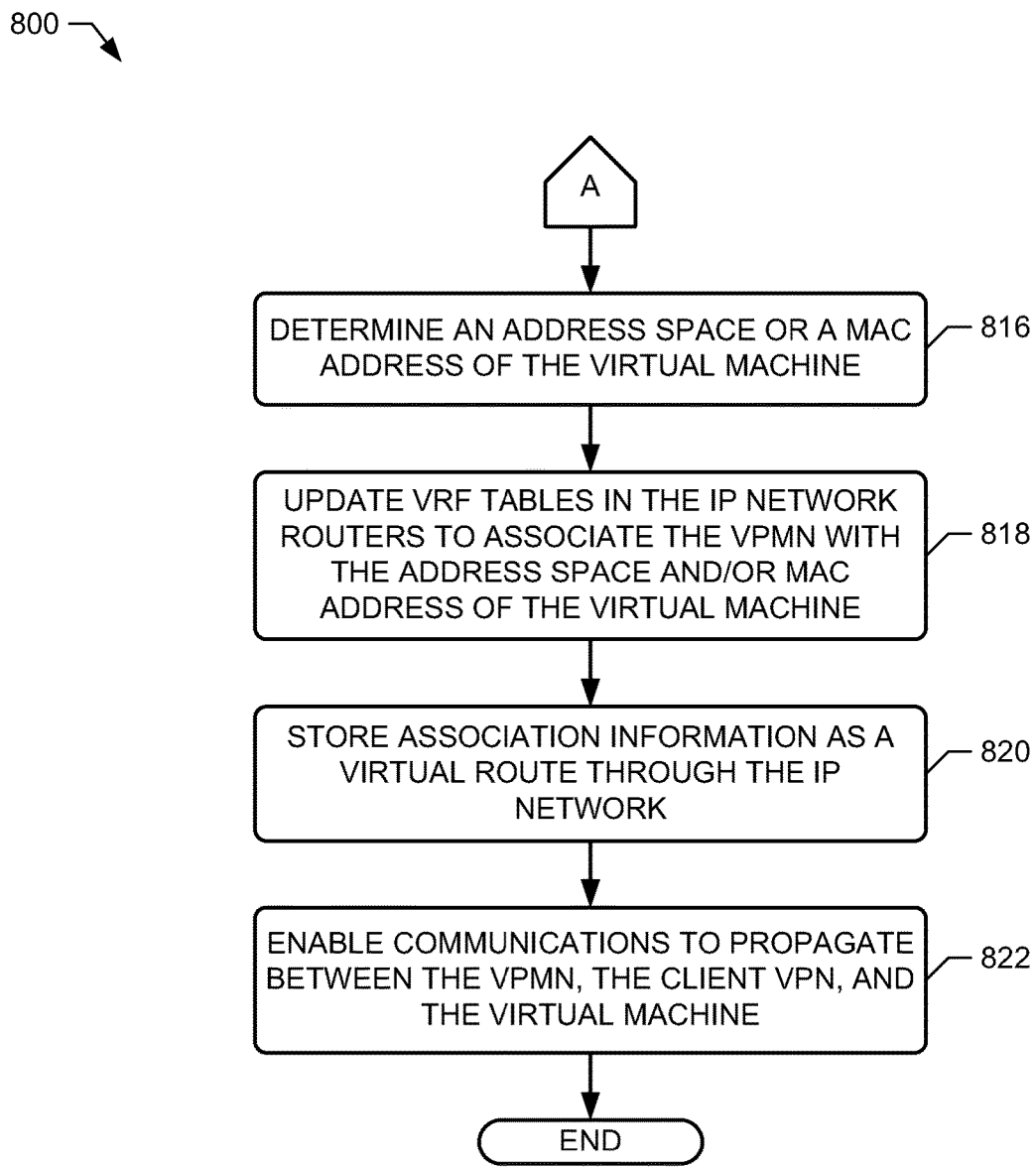
Figure 9:
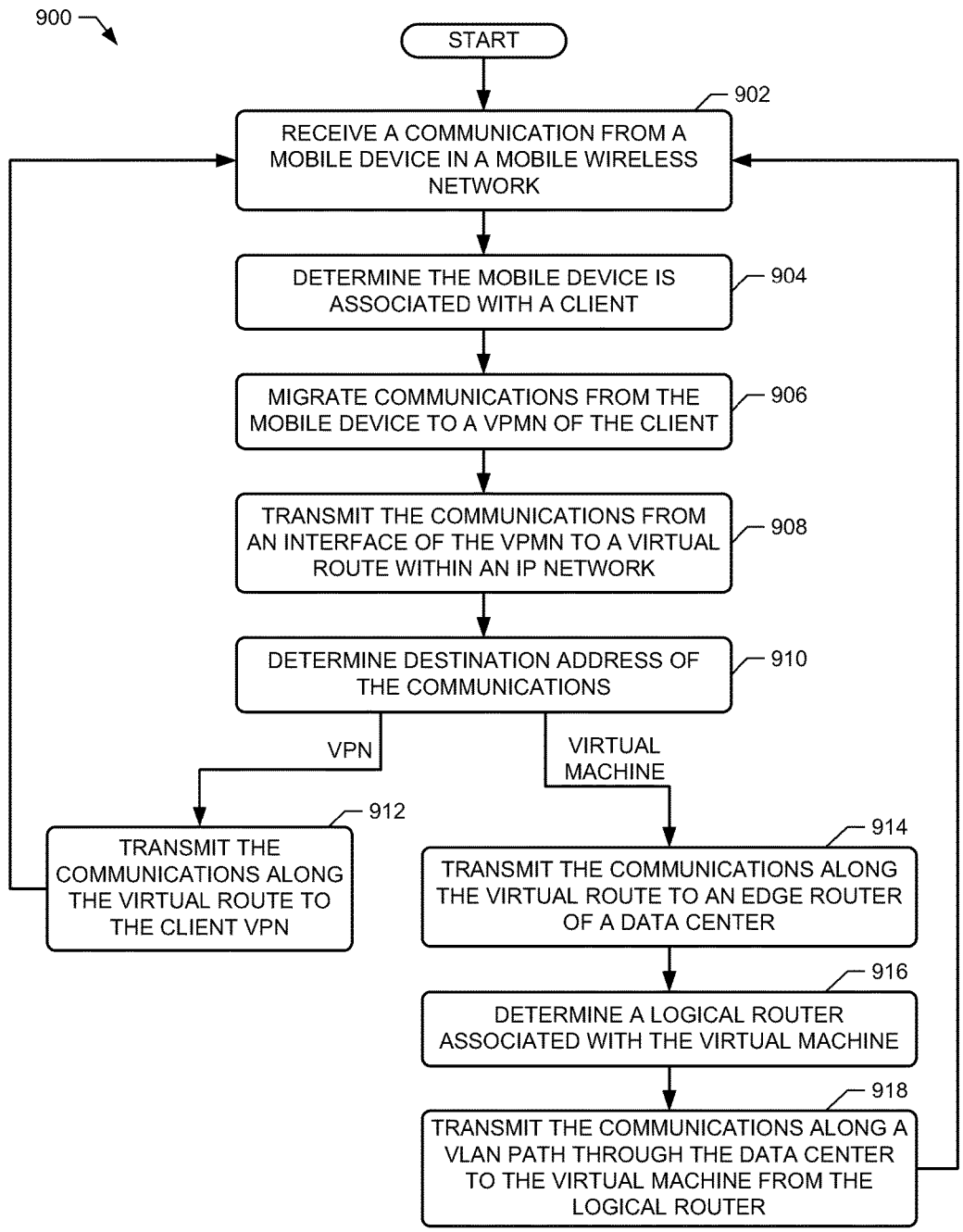

FIGS. 8A, 8B, and 9 depict example flow diagrams representative of processes that may be implemented using, for example, computer readable instructions that may be used to configure virtual private mobile networks to reduce latency. The example processes of FIGS. 8A, 8B, and 9 may be performed using a processor, a controller and/or any other suitable processing device. For example, the example processes of FIGS. 8A, 8B, and 9 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. The example processes of FIGS. 8A, 8B, and 9 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIGS. 8A, 8B, and 9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 8A, 8B, and 9 may be implemented manually or as any combination(s) of any of the foregoing techniques, for example, any combination of firmware, software, discrete logic and/or hardware. Further, although the example processes of FIGS. 8A, 8B, and 9 are described with reference to the flow diagrams of FIGS. 8A, 8B, and 9, other methods of implementing the processes of FIGS. 8A, 8B, and 9 may be employed. For example, the order of execution of the blocks may be changed, and/or some of the blocks described may be changed, eliminated, sub-divided, or combined. Additionally, any or all of the example processes of FIGS. 8A, 8B, and 9 may be performed sequentially and/or in parallel by, for example, separate processing threads, processors, devices, discrete logic, circuits, etc.

The example process 800 of FIGS. 8A and 8B couples VPMN to a client VPN and to a virtual machine provisioned for the client. The example process 800 begins by the example client interface 602 and/or the API interface 708 receiving an instruction to communicatively couple a VPMN to a client VPN and a virtual machine in a data center (block 802). The example VPMN controller 116 provisions the VPMN in, for example, the wireless network 102 (block 804). The example client coupler 130 then determines an address space of the VPMN and/or interface identifiers of the VPMN hosted by, for example, the network elements 108-112 and 310-314 of FIGS. 3-5 (block 806).

The example client coupler 130 of FIGS. 1, 6, and 7 also determines an address space if the client VPN (block 808). In some examples, a client administrator can provide the address space. In other examples, the client coupler 130 can determine the address space based on account information associated with the client. The example VPMN-VPN coupler 702 of FIG. 7 next updates VRF tables in the routers 204-208 in the IP network 102 by sending, for example, a BGP advertisement to associate the address space of the client VPN to the address space of an interface to a PDN gateway hosting the VPMN. In other examples, the BGP advertisement associates the address space of the client VPN to an address space assigned to the VPMN.

The example data center manager 220 next provisions the virtual machine within, for example, the cloud computing data center 134 (block 812). In other examples, the virtual machine is provisioned prior to the client requesting to couple the VPMN. The example client coupler 130 and/or the data center manager 220 then creates a VLAN path from a logical router partitioned within an edge router through the data center to the virtual machine to create a virtual path through the data center (block 814).

The example client coupler 130 determines an address space and/or MAC address of the provisioned virtual machine (block 816). The example couplers 704 and/or 706 update VRF tables of the routers 204-208 in the IP network 102 to associate the address space of the virtual machine with the VPMN and the VPN to create a virtual route through the IP network 102 (block 818). The example client coupler 130 then stores a record of this association information within the database 620 (block 820). The example client coupler 130 next enables communications to propagate between the VPMN, the client VPN, and the virtual machine via the virtual route (block 822). At this point, the example process 800 of FIGS. 8A and 8B terminates. In other instances, the example process 800 couples other VPMNs to other client VPNs and/or virtual machines.

The example process 900 of FIG. 9 transmits communications from a mobile device through a virtual route created by the client couple 130 of FIGS. 1, 2, 6 and 7. The example process 900 begins when the wireless mobile network 104 receives a communication from a mobile device (block 902). The mobile device may be attempting to access a VPMN, a client VPN and/or a virtual machine. The example VPMN controller 116 of FIG. 6 determines the mobile device is associated with a particular client (block 904). The VPMN controller 116 of the illustrated example determines the mobile device is associated with a client by matching mobile security credentials to a record of authorized devices provided by the client.

The example VPMN controller 116 then migrates communications associated with the mobile device to the appropriate VPMN of the client (block 906). The example network elements 108-112 of FIGS. 1 and 3-5 transmit the communications through the VPMN and the interface 114 to the corresponding virtual route within the IP network (block 908). In some examples, the network elements 108-112 only transmit the communications to the interface 114 if the communications are addressed to a destination outside of the wireless mobile network 104. The example routers 804-808 next determine a destination address of the communications (block 910).

If the destination is the client VPN, the routers 204-208 transmit the communications along the virtual route to the client VPN (block 912). At this point, the mobile device of the illustrated example communicates bidirectionally with computing resources within the client VPN. If the destination is the virtual machine, the example routers 204-208 transmit the communications along the virtual route to an edge router of the corresponding data center (block 914). The example edge router then determines a logical router associated with the virtual machine (block 916). This logical router transmits the communications along a provisioned VLAN path through the data center to the virtual machine (block 918). At this point, the mobile device may communicate bidirectionally with the virtual machine.

Figure 10:
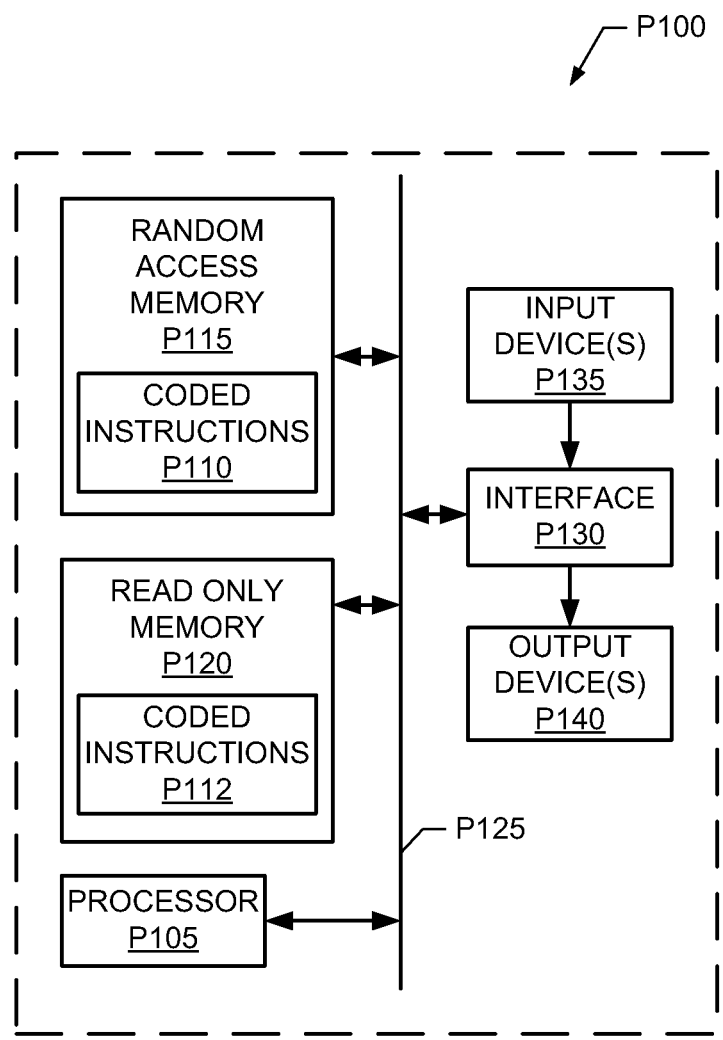
FIG. 10 is a schematic illustration of an example processor platform that may be used and/or programmed to execute the example processes and/or the example machine-accessible instructions of FIGS. 8A, 8B, and/or 9 to implement any or all of the example methods, apparatus and/or articles of manufacture disclosed herein.

FIG. 10 is a schematic diagram of an example processor platform P100 that may be used and/or programmed to implement the example client interface 602, the example client resource database 604, the example network manager 606, the example network monitor 608, the example data plane configurer 610, the example control plane configurer 612, the example mobile device configurer 614, the example APN manager 616, the example client coupler 130, the example database 620, the example device migrator 622, the example VPMN-VPN coupler 702, the example VPMN-DC coupler 704, the example VPN-DC coupler 706, the example API interface 708 and/or more generally, the example VPMN controller 116 of FIGS. 1-7. For example, the processor platform P100 can be implemented by one or more general-purpose processors, processor cores, microcontrollers, etc.

The processor platform P100 of the example of FIG. 10 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 8A, 8B, and 9 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example resource client database 604 and/or the database 620 of FIG. 6.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to configure a virtual private mobile network, the method comprising:

in response to a request to create a virtual private mobile network, scanning a public wireless mobile network, by executing an instruction with at least one processor, to identify network elements of the public wireless network that have available capacity to host the virtual private mobile network;

logically provisioning, by executing an instruction with the at least one processor, the virtual private mobile network to process wireless network communications associated with a client, the virtual private mobile network including partitions of at least some of the network elements identified as having available capacity, the partitions being logically separate from the public wireless mobile network implemented by the network element, the logically provisioning including updating a control plane of the network elements identified as having available capacity with an access point name assigned to the virtual private mobile network, and a portion of the virtual private mobile network provisioned on a local packet delivery network gateway;

provisioning, by executing an instruction with the at least one processor, at least a portion of a first server within a cloud computing data center to host resources for the client, the provisioning of at least the portion of the first server within the cloud computing data center to provision a first virtual machine on the first server;

configuring, by executing an instruction with the at least one processor, at least a portion of an edge router of the cloud computing data center to transmit the wireless network communications between the portion of the server and the virtual private mobile network;

determining whether a request to access an application available at the first virtual machine and available at a second virtual machine is to be transmitted to the first virtual machine or to the second virtual machine, the second virtual machine being provisioned on a second server in communication with the local packet delivery network gateway, the determining of whether the request to access the application is to be transmitted to the first virtual machine or to the second virtual machine includes determining whether the application is a latency sensitive application; and based on the determining, transmitting the request to access the application to one of the first virtual machine and the second virtual machine.

2. The method defined in claim 1, wherein the transmitting of the request to access the application to one of the first virtual machine and the second virtual machine includes transmitting the request to the second virtual machine when the application is determined to be a latency sensitive application.

3. The method as defined in claim 1, wherein the configuring of the at least the portion of the edge router includes storing the specified address space to a routing table of the edge router.

4. The method as defined in claim 1, further including:
determining a mobile device that is communicatively coupled to a wireless network is associated with the client; and
communicatively coupling the mobile device to the virtual private mobile network to enable the mobile device to access the resources.

5. The method as defined in claim 1, wherein the at least the portion of the first server is implemented by a virtual machine.

6. The method as defined in claim 5, wherein the resources are to operate enterprise applications to provide mobile platform-as-a-service accessible by mobile devices associated with the client.

7. The method defined in claim 1, wherein the virtual private mobile network is to transmit communications associated with latency sensitive applications.

8. The method defined in claim 7, wherein the communications originate from the mobile device.

9. A tangible computer readable medium comprising instructions stored thereon that, when executed, cause at least one machine to perform operations comprising:
in response to a request to create a virtual private mobile network, scanning a public wireless mobile network to identify network elements of the public wireless network that have available capacity to host the virtual private mobile network;
logically provisioning a virtual private mobile network to process wireless network communications associated with a client, the virtual private mobile network including partitions of at least some of the network elements identified as having available capacity, the partitions being logically separate from the public wireless mobile network implemented by the network elements, the logically provisioning including updating a control plane of the network elements identified as having capacity with an access point name assigned to the virtual private mobile network, a portion of the virtual private mobile network provisioned on a local packet delivery network gateway;

provisioning a first virtual machine executed by a first server within a data center to host resources for the client;

provisioning a virtual local area network within the data center and a logical router within an edge router of the data center;

determining whether a request to access an application available at the first virtual machine and available at a second virtual machine is to be transmitted to the first virtual machine or to the second virtual machine, the determining of whether the request to access the application is to be transmitted to the first virtual machine or to the second virtual machine includes determining whether the application is a latency sensitive application, the second virtual machine being provisioned on a second server coupled to the local packet delivery network gateway; and based on the determining, transmitting the request to access the application to one of the first virtual machine and the second virtual machine.

10. The tangible computer readable medium as defined in claim 9, the operations further including:
updating routing and forwarding tables within network routers between a virtual private network and the virtual private mobile network to create a virtual route between the virtual private network and the virtual private mobile network;
configuring the first virtual machine to communicate with the virtual private mobile network by updating the routing and forwarding tables within the network routers and the logical router to associate the virtual private mobile network with a second address space corresponding to the first virtual machine and the virtual local area network; and
creating a secure virtual route among the network routers between the virtual private mobile network, the virtual private network, and the first virtual machine.

11. The tangible computer readable medium as defined in claim 9, the operations further including:
determining a mobile device that is communicatively coupled to the wireless network is associated with the client; and
configuring the mobile device to enable the mobile device to securely access the virtual private network and the virtual machine.

12. An apparatus to configure a virtual private mobile network, the apparatus comprising:
at least one processor; and
memory including machine readable instructions which, when executed by the processor, cause the at least one processor to perform operations including:
in response to a request to create a virtual private mobile network, scanning a public wireless mobile network to identify network elements of the public wireless mobile network having available capacity to host the virtual private mobile network;
logically provisioning the virtual private mobile network to process wireless network communications associated with a client, the virtual private mobile network including partitions of at least a subset of the network elements identified as having available capacity, the partitions being logically separate from the public wireless mobile network implemented by the at least the subset of the network elements a portion of the virtual private mobile network provisioned on a local packet delivery network gateway;

provisioning at least a portion of a first server within a cloud computing environment to host resources for the client;

configuring at least a portion of an edge router of the cloud computing environment to transmit the wireless network communications between the portion of the server and the virtual private mobile network;

determining whether a request to access an application available at a first virtual machine provisioned on the first server and available at a second virtual machine provisioned on a second server is to be transmitted to the first virtual machine or to the second virtual machine, the determining of whether the request to access the application is to be transmitted to the first virtual machine or to the second virtual machine includes determining whether the application is a latency sensitive application, the second virtual machine provisioned on the second server, the second server coupled to the local packet delivery network gateway; and based on the determining, transmitting the request to access the application to one of the first virtual machine and the second virtual machine.

13. The apparatus as defined in claim 12, the operations further including configuring the at least the portion of the edge router by storing the specified address space to a routing table of the edge router.

14. The apparatus as defined in claim 12, the operations further including determining a mobile device that is communicatively coupled to a wireless network is associated with the client; and coupling the mobile device to the virtual private mobile network to enable the mobile device to access the resources.

* * * * *